(12) United States Patent
Otsuka et al.

(10) Patent No.: US 12,491,911 B2
(45) Date of Patent: Dec. 9, 2025

(54) AUTONOMOUS TRAVEL CONTROL SYSTEM

(71) Applicant: HITACHI, LTD., Tokyo (JP)

(72) Inventors: Satoshi Otsuka, Tokyo (JP); Tasuku Ishigooka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 190 days.

(21) Appl. No.: 18/025,022

(22) PCT Filed: Aug. 27, 2021

(86) PCT No.: PCT/JP2021/031562
§ 371 (c)(1),
(2) Date: Mar. 7, 2023

(87) PCT Pub. No.: WO2022/080018
PCT Pub. Date: Apr. 21, 2022

(65) Prior Publication Data
US 2023/0322261 A1    Oct. 12, 2023

(30) Foreign Application Priority Data

Oct. 16, 2020  (JP) ................................ 2020-174519

(51) Int. Cl.
*B60W 60/00* (2020.01)
*B60W 50/02* (2012.01)

(52) U.S. Cl.
CPC .... *B60W 60/0015* (2020.02); *B60W 50/0205* (2013.01); *B60W 2554/4046* (2020.02)

(58) Field of Classification Search
CPC ......... B60W 60/0015; B60W 50/0205; B60W 2554/4046; B60W 30/09; B60W 30/0956;
(Continued)

(56) References Cited

U.S. PATENT DOCUMENTS 10,649,453 B1 *   5/2020   Svegliato ............ B60W 50/029
10,921,142 B2 *   2/2021   Dittmer ................ G05D 1/0246
(Continued)

FOREIGN PATENT DOCUMENTS

JP    2018151908 A    9/2018
JP    2019079363 A    5/2019
(Continued)

OTHER PUBLICATIONS

International Search Report of PCT/JP2021/031562 dated Sep. 21, 2021.
(Continued)

*Primary Examiner* — Sihar A Karwan
(74) *Attorney, Agent, or Firm* — MATTINGLY & MALUR, PC

(57) ABSTRACT

An autonomous travel control system having a vehicle control system that is mounted in a vehicle and that controls automatic driving of the vehicle, and a safety monitoring system for monitoring a field F, are connected so as to enable communication. The safety monitoring system is provided with: a monitoring processing unit for recognizing an object and creating outside world recognition information; a reception unit for receiving automatic driving control information transmitted from the vehicle control system; a verification unit for verifying, on the basis of the outside world recognition information, the safety of the automatic driving control information received by the reception unit; and a transmission unit for transmitting the result of the verification by the verification unit to the vehicle control system. The vehicle control system controls automatic driving of the vehicle on the basis of the verification result transmitted by the safety monitoring system.

7 Claims, 14 Drawing Sheets

(58) Field of Classification Search
CPC ..... B60W 2050/0292; B60W 2556/45; B60W 50/029; B60W 60/00272; B60W 60/007; G08G 1/161; G08G 1/164; G08G 1/165; G08G 1/166; G08G 1/167; G16Y 10/40; G16Y 20/20; G16Y 40/10

See application file for complete search history.

(56) References Cited

U.S. PATENT DOCUMENTS

| | | | |
|---|---|---|---|
| 11,718,319 B2* | 8/2023 | Lau | G06V 20/13 701/23 |
| 2016/0161270 A1* | 6/2016 | Okumura | G08G 1/165 701/23 |
| 2016/0161271 A1* | 6/2016 | Okumura | B60W 30/18154 701/25 |
| 2016/0180171 A1* | 6/2016 | Kamata | G06V 20/56 382/103 |
| 2017/0166204 A1* | 6/2017 | Yoo | G08G 1/16 |
| 2018/0011485 A1* | 1/2018 | Ferren | G05D 1/0038 |
| 2018/0059667 A1* | 3/2018 | Kuroda | G06V 20/58 |
| 2018/0188735 A1* | 7/2018 | Sugawara | B60W 30/095 |
| 2019/0129434 A1* | 5/2019 | Morimura | G05D 1/0027 |
| 2019/0171218 A1* | 6/2019 | Hammond | G05D 1/0223 |
| 2019/0235517 A1* | 8/2019 | Beauvillain | B60W 40/04 |
| 2019/0329771 A1* | 10/2019 | Wray | B60W 30/18154 |
| 2020/0005645 A1* | 1/2020 | Wray | G08G 1/166 |
| 2020/0010081 A1* | 1/2020 | Yoon | B60W 50/0097 |
| 2020/0012873 A1* | 1/2020 | Kim | B60W 30/09 |
| 2020/0098269 A1* | 3/2020 | Wray | B60W 30/10 |
| 2020/0207338 A1 | 7/2020 | Cho | |
| 2020/0298880 A1* | 9/2020 | Kamata | G08G 1/0116 |
| 2021/0001882 A1* | 1/2021 | Mortazavi | G08G 1/096725 |
| 2021/0163021 A1* | 6/2021 | Frazzoli | B60W 50/023 |
| 2021/0284173 A1* | 9/2021 | Ohnishi | B60W 60/00253 |
| 2022/0011771 A1* | 1/2022 | Matsunaga | B60W 30/182 |

FOREIGN PATENT DOCUMENTS

| | | |
|---|---|---|
| JP | 2019133248 A | 8/2019 |
| JP | 2020154578 A | 9/2020 |
| WO | 2020196084 A1 | 10/2020 |
| WO | 2020202378 A1 | 10/2020 |

OTHER PUBLICATIONS

Extended European Search Report received in corresponding European Application No. 21879760.3 dated Nov. 13, 2024.

* cited by examiner

AUTONOMOUS TRAVEL CONTROL SYSTEM

TECHNICAL FIELD

The present invention relates to an autonomous travel control system.

BACKGROUND ART

Background arts of the present technical field include JP 2019-133248 A (PTL 1). PTL 1 describes that "To provide a vehicle control system for enabling a single vehicle to determine whether or not an appropriate control schedule plan has been prepared in preparing a control schedule plan for vehicle equipment on the basis of influence information." as a problem. As a solution to it, PTL 1 describes that "In a vehicle control system, a determination section compares transition of an actual control operation amount in a vehicle with transition of a scheduled control operation amount based on a control schedule plan, so as to determine whether a control schedule plan of vehicle equipment is appropriate or inappropriate in response to whether or not divergence being equal to or more than a predetermined reference value exists (S230-S270). Consequently, even when an inappropriate control schedule plan has been prepared, a single vehicle can determine that a prepared control schedule plan is inappropriate."

Other background arts include JP 2019-79363 A (PTL 2). PTL 2 describes that "To provide a vehicle control device capable of realizing that after confirming a traffic participants' understanding of a vehicle's action schedule, the vehicle enables a safe action." as a problem. As a solution to it, PTL 2 describes that "In a vehicle M2, a vehicle control device 1 is comprised of: an external situation recognition unit 11 that recognizes a traffic participant around a vehicle; an action schedule acquisition unit 12 that acquires an action schedule of the vehicle; an action schedule notification unit 13 which notifies an action schedule to a terminal T possessed by a traffic participant of the vehicle and requests an approval; and a receiving unit 14 that can receive the approval for the action schedule from the terminal T. When the receiving unit 14 receives the approval from the terminal, the action schedule is executed, and when the receiving unit 14 does not receive the approval of the action schedule from the terminal T, the execution of the action schedule is suppressed."

CITATION LIST

Patent Literature

PTL 1: JP 2019-133248 A
PTL 2: JP 2019-79363 A

SUMMARY OF INVENTION

Technical Problem

In relation to the above background arts, in recent years, there has been proposed an automatic driving system that creates a track (automatic driving control information) indicating a future position of an own vehicle on the basis of external recognition information and self-position information, and controls the vehicle on the basis of this track. There is an automatic driving system that calculates information relative to surrounding objects on the basis of external recognition information and assists a user.

On the other hand, in a case where there is an error in the automatic driving control information generated by the automatic driving system, or in a case of a peripheral situation (running out of a pedestrian or another vehicle) that the automatic driving system cannot recognize, there is a possibility that the collision risk becomes high. Improvement of safety in such a case and improvement of efficiency at the same time are important in the spread of the automatic driving system, but they are not considered at all in PTLs 1 and 2.

In particular, there is a possibility that an error (performance limit or failure of recognition device, failure of vehicle control system, or the like) exists in the information recognized by the automatic driving system of a vehicle alone. Therefore, it is important in terms of safety to perform control using a result of verification including errors in a plurality of systems, and further to perform control by external intervention as necessary.

The present invention has been made in view of the above, and an object of the present invention is to construct an autonomous travel control system including a safety monitoring system outside a moving body and to provide an autonomous travel control system that can improve safety and efficiency as compared with an automatic driving system of a single moving body.

Solution to Problem

In order to solve the above problems, an autonomous travel control system according to the present invention is an autonomous travel control system in which a moving body control system that is equipped in a moving body and controls automatic driving of the moving body and a safety monitoring system that monitors a field where the moving body travels are communicably connected, in which the safety monitoring system includes a monitoring processing unit that recognizes an object that exists in the field from a monitoring result of the field and creates external recognition information of the field on a basis of a recognition result, a reception unit that receives automatic driving control information transmitted from the moving body control system and controls the automatic driving of the moving body, a verification unit that verifies safety of the automatic driving control information received by the reception unit on a basis of the external recognition information created by the monitoring processing unit, and a transmission unit that transmits a verification result by the verification unit to the moving body control system, and the moving body control system controls the automatic driving on a basis of the verification result transmitted by the transmission unit of the safety monitoring system.

Advantageous Effects of Invention

According to the present invention, it is possible to provide an autonomous travel control system that can improve safety and efficiency as compared with an automatic driving system of a single moving body.

Problems, configurations, and effects other than those described above will be made clear by the following description of embodiments.

DESCRIPTION OF EMBODIMENTS

Embodiments of the present invention will be described below with reference to the drawings. Unless otherwise specified, the configurations given the same reference signs in each embodiment have similar functions in each embodiment, and its description will be omitted.

The autonomous travel control system of the present embodiment is a system in which a moving body control system that controls automatic driving of a moving body such as an automobile, a railway vehicle, a construction machine, an automatic guided vehicle, or a robot and a safety monitoring system that monitors a field where the moving body travels are communicably connected. Hereinafter, a vehicle 102 such as an automobile will be described as a moving body, and a vehicle control system 302 equipped on the vehicle 102 will be described as a moving body control system. Hereinafter, an autonomous travel control system 1 including the vehicle control system 302 and a safety monitoring system 101 that monitors and controls the vehicle control system 302 will be described. The following description does not preclude application to a moving body control system other than the vehicle control system 302 and a safety monitoring system other than the safety monitoring system 101.

First Embodiment

<Overall Configuration of Autonomous Travel Control System>

Figure 1:
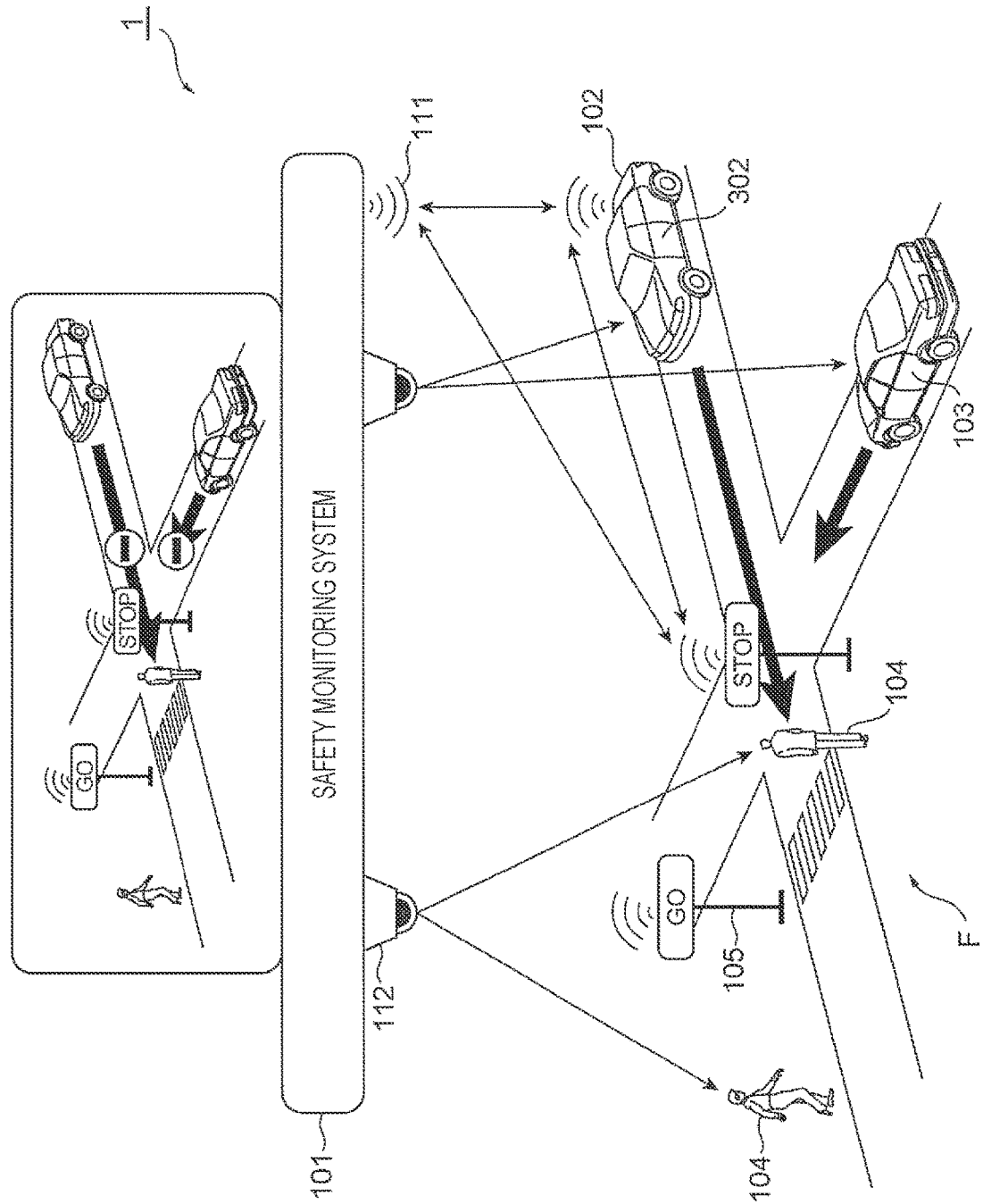
FIG. 1 is a view illustrating an example of a configuration of an autonomous travel control system of a first embodiment.

FIG. 1 is a view illustrating an example of the configuration of the autonomous travel control system 1 of the first embodiment.

The autonomous travel control system 1 is a system in which a vehicle control system 302 that is equipped on a vehicle 102 and controls automatic driving of the vehicle 102 and a safety monitoring system 101 that monitors a field where the vehicle 102 travels are communicably connected.

The safety monitoring system 101 communicates with a plurality of vehicle control systems including the vehicle control system 302, and monitors a field F including the vehicle 102 and other objects (another vehicle 103, a pedestrian 104, a motorless light vehicle such as a bicycle, and the like). The vehicle 102 includes the vehicle control system 302 including a communication device 303 and performs operation such as autonomous travel while communicating with the safety monitoring system 101. The vehicle 103 may be a vehicle that does not include a communication device and does not communicate with the safety monitoring system 101. A traffic regulation device 105 is a traffic light or the like that regulates traffic. The safety monitoring system 101 includes a communication device 111 that communicates with the vehicle 102, the traffic regulation device 105, or the like, and a monitoring device 112 such as a camera that monitors the field F.

<Configuration of Safety Monitoring System>

Figure 2:
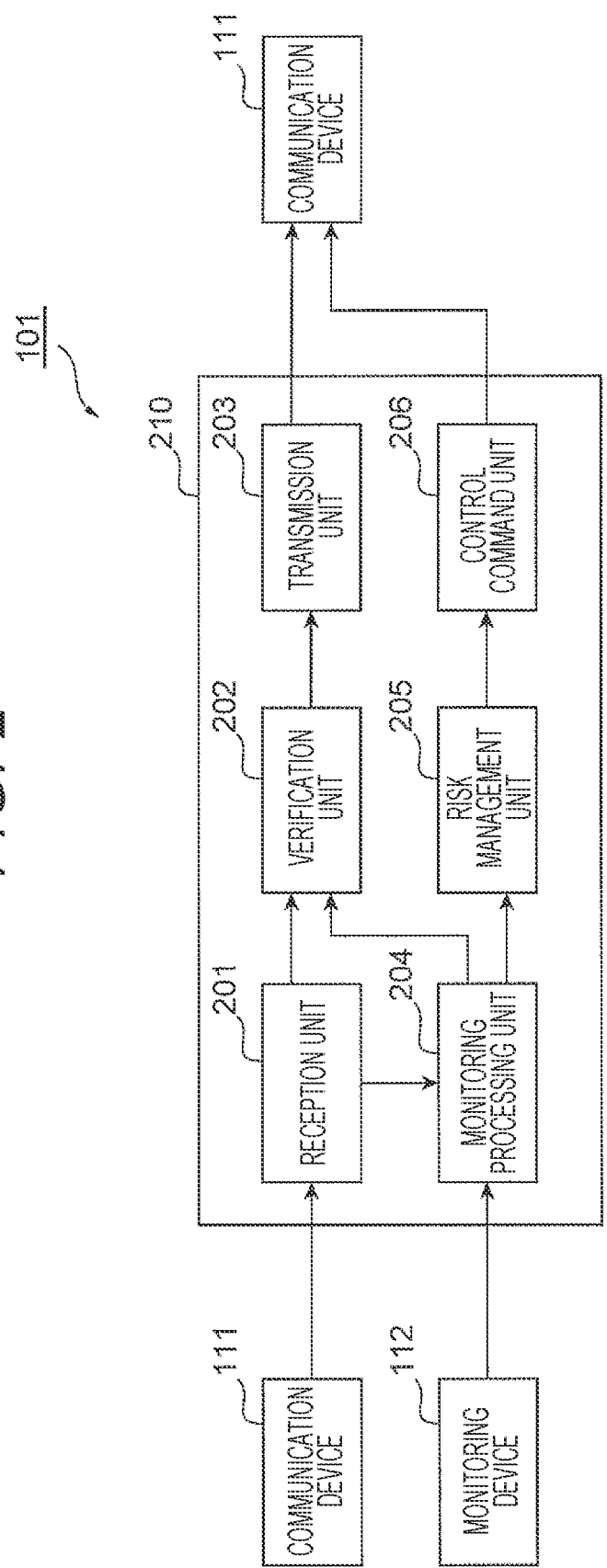
FIG. 2 is a view illustrating an example of a configuration of a safety monitoring system illustrated in FIG. 1.

FIG. 2 is a view illustrating an example of the configuration of the safety monitoring system 101 illustrated in FIG. 1.

The safety monitoring system 101 includes the communication device 111, the monitoring device 112, and a monitoring control device 210. The communication device 111 transmits and receives various types of information (automatic driving control information, verification result, and the like described below) to and from the vehicle control system 302 via the communication device 303 of the vehicle 102, and transmits and receives the result to and from the monitoring control device 210. The monitoring device 112 transmits the monitoring result of the field F to the monitoring control device 210. The monitoring device 112 may be configured similarly to a recognition device 306 described below.

The monitoring control device 210 includes a reception unit 201, a verification unit 202, a transmission unit 203, a monitoring processing unit 204, a risk management unit 205, and a control command unit 206.

The reception unit 201 receives, from the communication device 111, the automatic driving control information transmitted by the vehicle control system 302 and received by the communication device 111, and transmits the automatic driving control information to the verification unit 202 and the monitoring processing unit 204. The automatic driving control information is information for controlling automatic driving of the vehicle 102. For example, the automatic driving control information is information of a track indicating a future position of the vehicle 102. The automatic driving control information is transmitted from the vehicle control system 302 in real time.

The monitoring processing unit 204 receives the monitoring result of the field F from the monitoring device 112, and recognizes an object existing in the field F from the monitoring result. The monitoring processing unit 204 creates external recognition information described below on the basis of the recognition result. The monitoring processing unit 204 can integrate the created external recognition information and create an external recognition map of the field F. The monitoring processing unit 204 transmits the created external recognition information (or external recognition map) to the verification unit 202 and the risk management unit 205.

On the basis of the external recognition information created by the monitoring processing unit 204, the verification unit 202 verifies the safety of the automatic driving control information received by the reception unit 201, and determines whether or not to approve the automatic driving control information. When the automatic driving control information received by reception unit 201 is safe, the verification unit 202 transmits, to the transmission unit 203, a verification result indicative of approving the automatic driving control information. When the automatic driving control information received by reception unit 201 is not safe, the verification unit 202 transmits, to the transmission unit 203, a verification result indicative of not approving the automatic driving control information. The transmission unit 203 transmits the verification result by the verification unit 202 to the communication device 111.

The risk management unit 205 can verify the safety of the field F on the basis of the external recognition information (or the external recognition map) created by the monitoring processing unit 204 and the automatic driving control information received by the reception unit 201. Specifically, when the vehicle 102 travels on the basis of the automatic driving control information received by the reception unit 201, the risk management unit 205 can verify whether or not it is assumed that a high risk situation (situation of extremely approaching or colliding with another object) occurs after a lapse of a predetermined time in the vehicle 102 traveling in the field F. When a high risk situation is assumed to occur, the risk management unit 205 can create and transmit, to the control command unit 206, a control command for the vehicle control system 302 of the vehicle 102 that is the transmission source of the automatic driving control information. When the verification result of the verification unit 202 is indicative of not approving the automatic driving control information, the risk management unit 205 can create a control command as described above on the assumption that a high risk situation will occur.

The control command created by the risk management unit 205 is, for example, override control information including automatic driving control information of the vehicle 102 in which a high risk situation is assumed to occur. The override control is that the safety monitoring system 101 controls the automatic driving of the vehicle 102 instead of the vehicle control system 302. The override control information is information such as a control command transmitted to the vehicle control system 302 in order for the safety monitoring system 101 to perform the override control.

The control command unit 206 transmits the control command created by the risk management unit 205 to the vehicle control system 302 of the vehicle 102 in which a high risk situation is assumed to occur. Details of each of the external recognition information, the automatic driving control information, the override control information, and the like will be described below.

<Configuration of Vehicle Equipped with Vehicle Control System>

Figure 3:
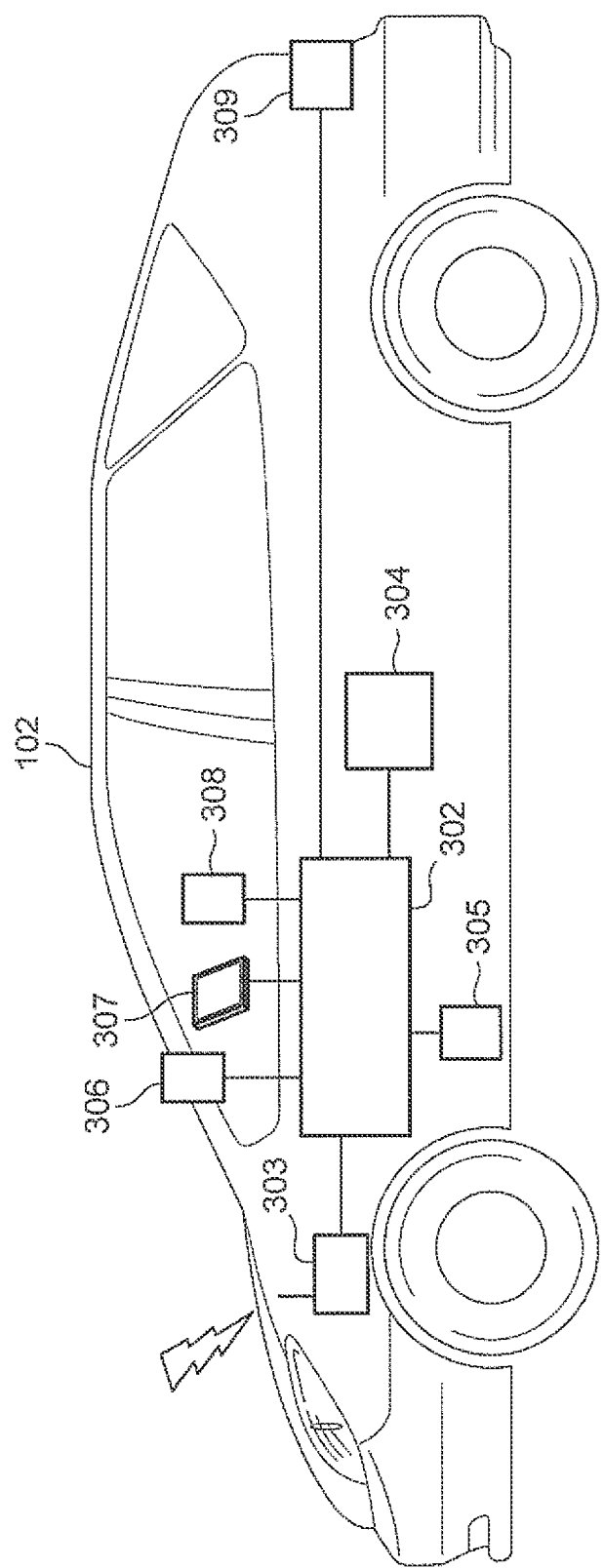
FIG. 3 is a view illustrating an example of a configuration of a vehicle equipped with a vehicle control system illustrated in FIG. 1.

FIG. 3 is a view illustrating an example of the configuration of the vehicle 102 equipped with the vehicle control system 302 illustrated in FIG. 1.

The vehicle 102 includes the vehicle control system 302, the communication device 303, a vehicle control system 304, a drive device 305, the recognition device 306, an output device 307, an input device 308, and a notification device 309.

The vehicle control system 302 is a control system that is equipped on the vehicle 102 and controls automatic driving of the vehicle 102. The vehicle control system 302 is a control system that controls automatic driving of the vehicle 102 on the basis of the verification result by the verification unit 202 transmitted by the safety monitoring system 101.

The vehicle control system 302 includes, for example, an in-vehicle network (controller area network (CAN), CAN with flexible data-rate (CANFD), Ethernet (registered trademark), and the like) and a control unit (electronic control unit (ECU) and the like). The vehicle control system 302 is connected to each of the communication device 303, another vehicle control system 304, the drive device 305, the recognition device 306, the output device 307, the input device 308, and the notification device 309, and transmits and receives various types of information.

The communication device 303 performs communication between the vehicle 102 and the outside. For example, the communication device 303 performs wireless communication by a mobile phone system or wireless communication using a protocol such as wireless LAN, WAN, or car to X (C2X: vehicle-to-vehicle or vehicle-to-infrastructure communication). The communication device 303 performs wireless communication using a global positioning system (GPS and the like). The communication device 303 transmits, to the communication device 111 of the safety monitoring system 101, various types of information such as external information (including information on infrastructure, other vehicles, maps, and the like) including the field F and information regarding the own vehicle such as automatic driving control information. The communication device 303 transmits and receives various types of information to and from the vehicle control system 302. The communication device 303 includes a diagnostic terminal (OBD), an Ethernet terminal, and an external recording medium (for example, a USB memory, an SD card, or the like) terminal.

The vehicle control system 304 is another vehicle control system different from the vehicle control system 302, which controls automatic driving of the vehicle 102. The vehicle control system 304 includes an in-vehicle network using a protocol different from or the same as that of the vehicle control system 302, and a control unit.

The drive device 305 is an actuator or the like that drives a machine and an electric device (for example, an engine, a transmission, a wheel, a brake, a steering device, and the like) that control vehicle motion in accordance with control from the vehicle control system 302.

The recognition device 306 includes an external sensor that senses the external world, such as a camera, a radar, light detection and ranging (LiDAR), or an ultrasonic sensor, and a dynamic system sensor that detects the state (motion state, position information, acceleration, wheel speed, and the like) of the vehicle 102. The recognition device 306 may include a combination of a plurality of types of external sensors. The recognition device 306 transmits information acquired by these sensors to the vehicle control system 302.

The output device 307 is a device that is connected to a network system in a wired or wireless manner, receives data transmitted from the network system, and displays or outputs necessary information such as message information (for example, video or sound). The output device 307 includes, for example, a liquid crystal display, a warning light, or a speaker.

The input device 308 is a device that is operated by the user and generates an input signal for transmitting, to the vehicle control system 302, the intention or instruction of the user indicated by the operation. The input device 308 includes, for example, a steering wheel, a pedal, a button, a lever, or a touchscreen.

The notification device 309 is a device for the vehicle 102 to notify the external world of the state of the vehicle 102 and the like. The notification device 309 includes, for example, a lamp, an LED, and a speaker.

Figure 4:
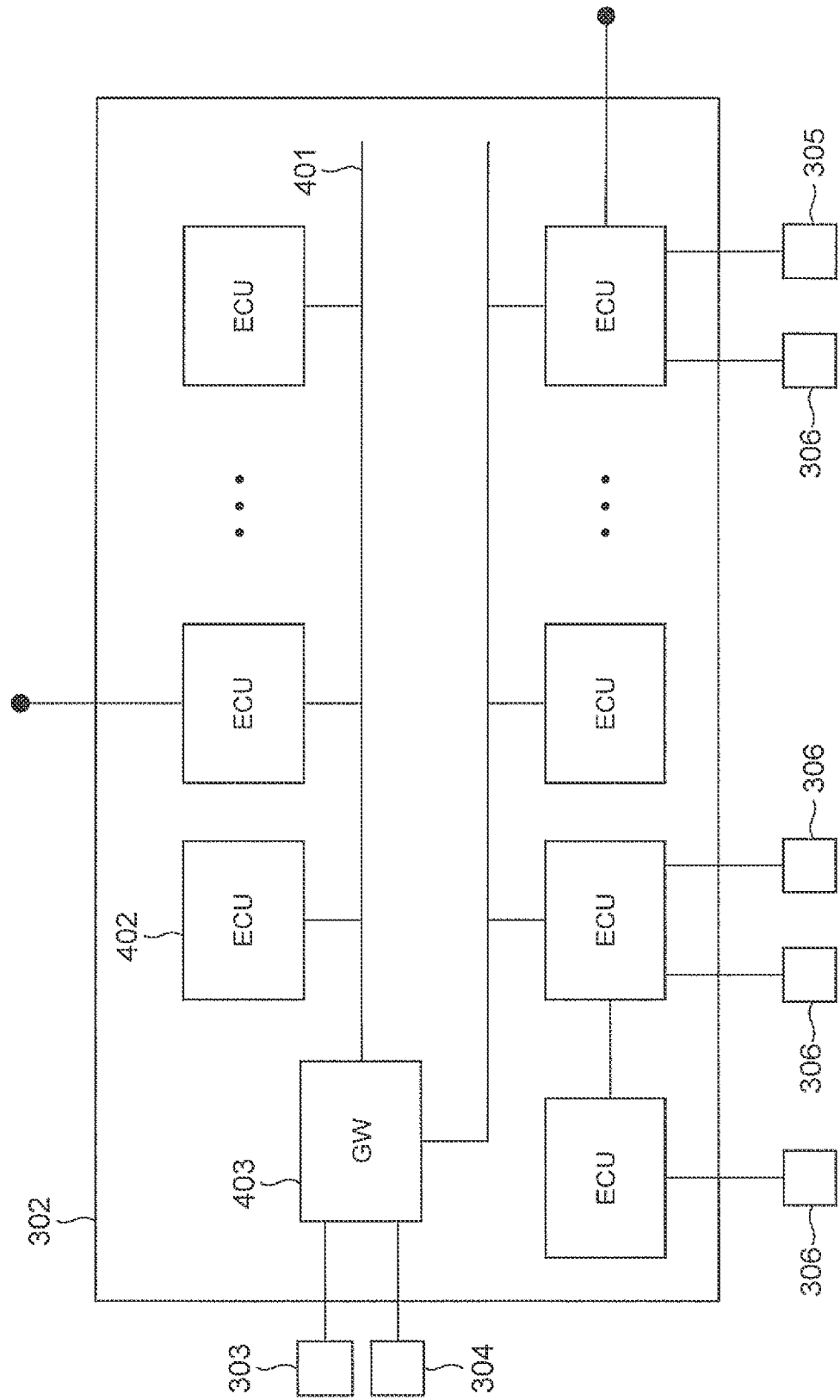
FIG. 4 is a view illustrating an example of a hardware configuration of the vehicle control system illustrated in FIG. 3.

FIG. 4 is a view illustrating an example of the hardware configuration of the vehicle control system 302 illustrated in FIG. 3.

The vehicle control system 302 includes a network link 401, an ECU 402, and a gateway (GW) 403.

The network link 401 is a network link that connects network devices on the in-vehicle network. The network link 401 includes, for example, a network link such as a CAN bus. The ECU 402 is connected to each of the network link 401, the drive device 305, the recognition device 306, and another network link (including a dedicated line) other than the network link 401. The ECU 402 controls the drive device 305 and the recognition device 306, acquires information from the drive device 305 and the recognition device 306, and transmits and receives data to and from another network. In particular, the ECU 402 outputs a control signal to the drive device 305 on the basis of data received from the network link 401 or another network, and acquires information from the recognition device 306. The ECU 402 outputs a control signal and information to the network link 401 or another network, and performs control processing such as changing an internal state. The GW 403 connects a plurality of the network links 401 and transmits and receives data to and from each network link 401.

Figure 5:
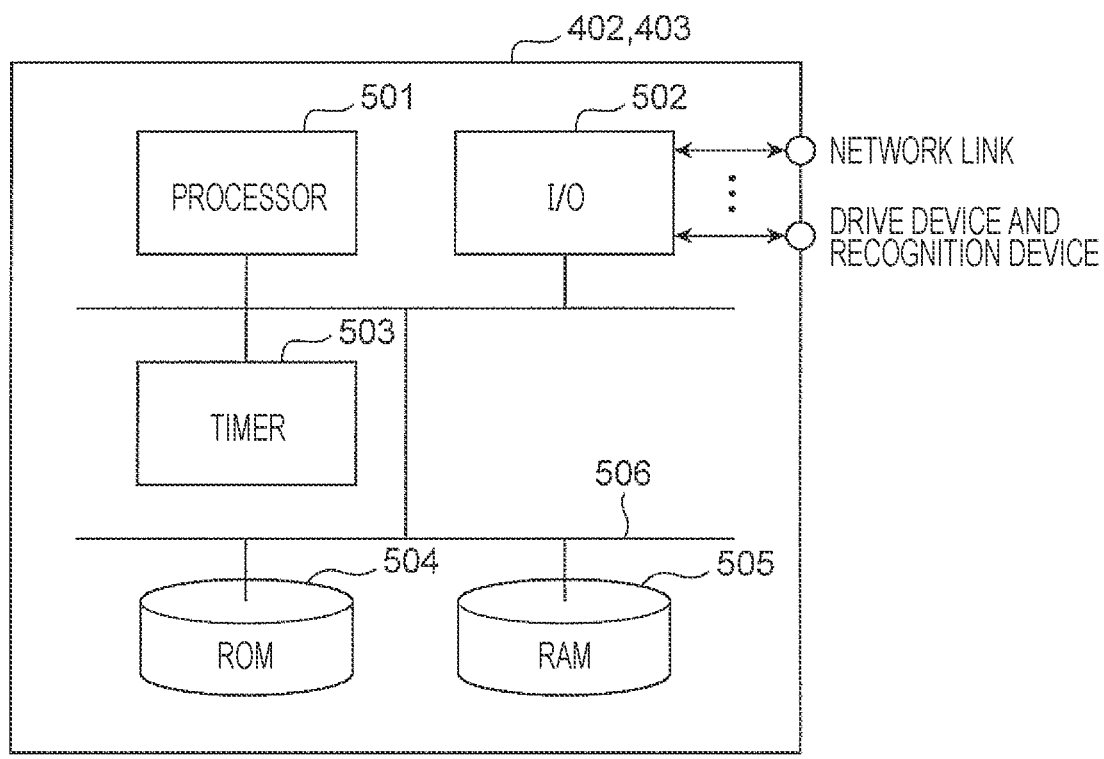
FIG. 5 is a view illustrating an example of an internal configuration of an ECU or a GW illustrated in FIG. 4.

FIG. 5 is a view illustrating an example of the internal configuration of the ECU 402 or the GW 403 illustrated in FIG. 4.

The ECU 402 includes a processor 501, an input/output (I/O) 502, a timer 503, a read only memory (ROM) 504, a random access memory (RAM) 505, and an internal bus 506. The same applies to the GW 403.

The processor 501 is an arithmetic device such as a central processing unit (CPU) that has a storage element such as a cache or a register and performs various types of arithmetic processing. The I/O 502 is an interface circuit that controls transmission and reception of data to and from the drive device 305 and/or the recognition device 306 connected by the network link 401 or another network (including a dedicated line). The timer 503 manages time and clock time using a clock not illustrated or the like. The ROM 504 is a nonvolatile storage element, and stores an invariable program and invariable data. The RAM 505 is a high-speed, volatile storage element, and stores programs and data executed by the processor 501. The internal bus 506 is used for communication inside the ECU 402.

Figure 6:
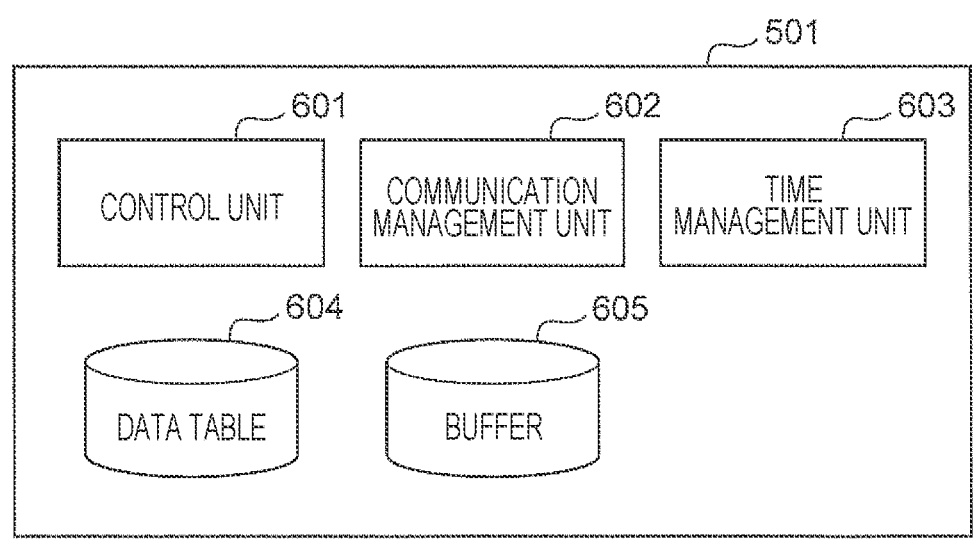
FIG. 6 is a view illustrating an example of a configuration of a software component that operates by a processor illustrated in FIG. 5.

FIG. 6 is a view illustrating an example of the configuration of a software component that operates by a processor 501 illustrated in FIG. 5.

The software component operating in the processor 501 includes a control unit 601, a communication management unit 602, a time management unit 603, a data table 604, and a buffer 605.

The communication management unit 602 manages the operation and the state of the I/O 502 and gives an instruction to the I/O 502 via the internal bus 506. The time management unit 603 manages the timer 503, acquires information regarding time, and uses the information for control regarding time. The control unit 601 analyzes data acquired from the I/O 502 and integrally controls the entire software component. Each function of the vehicle control system 302 is controlled by the control unit 601. The data table 604 holds various types of information such as an external recognition map. The buffer 605 temporarily holds data.

The configuration illustrated in FIG. 6 illustrates an operation concept on the processor 501. The processor 501 appropriately reads information necessary at the time of operation from the ROM 504 and/or the RAM 505, and executes a program while appropriately writing an arithmetic processing result to the ROM 504 and/or the RAM 505.

Figure 7:
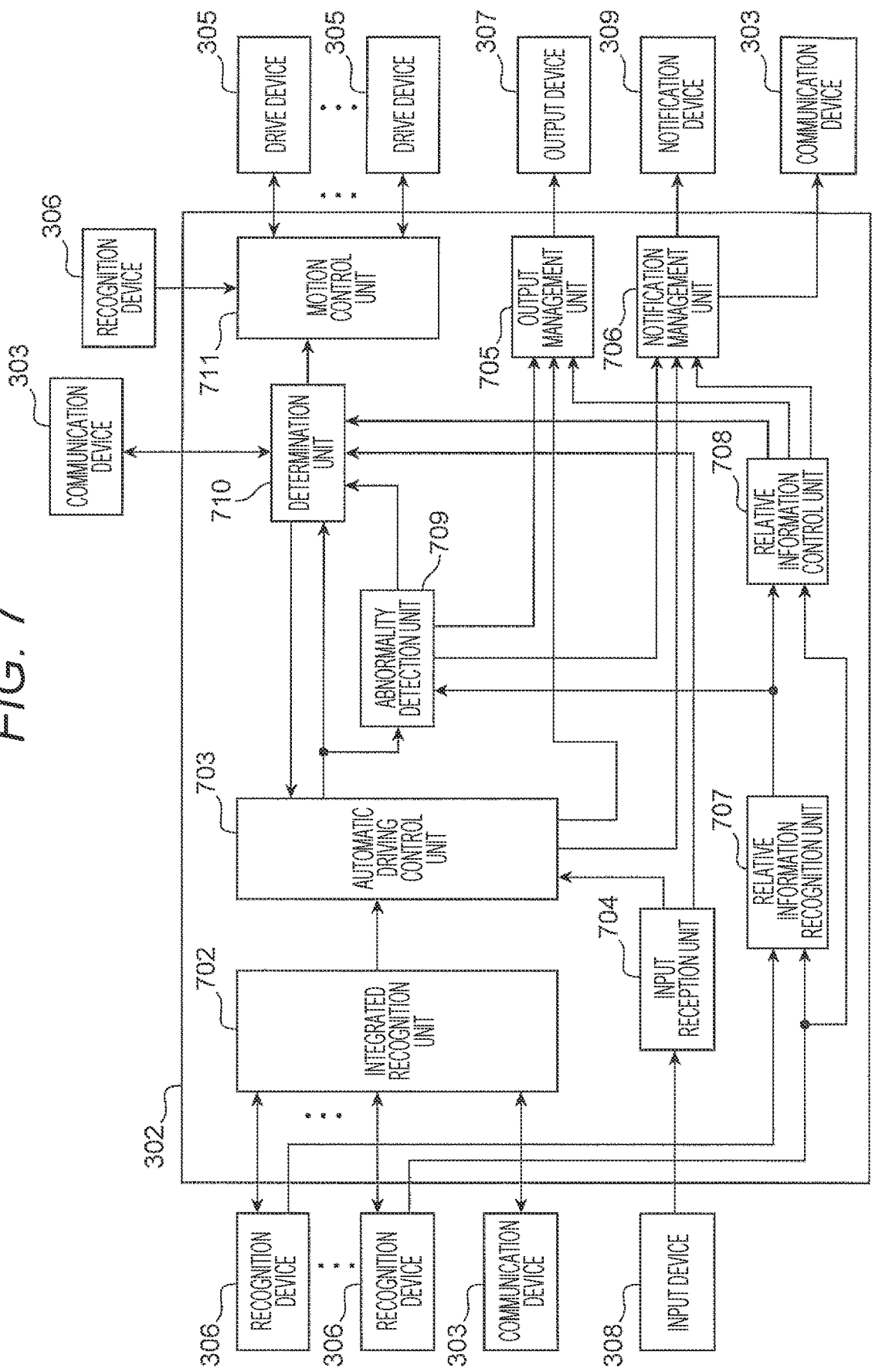
FIG. 7 is a view illustrating an example of a functional configuration of the vehicle control system illustrated in FIG. 3.

FIG. 7 is a view illustrating an example of the functional configuration of the vehicle control system 302 illustrated in FIG. 3.

The vehicle control system 302 includes an integrated recognition unit 702, an automatic driving control unit 703, an input reception unit 704, an output management unit 705, a notification management unit 706, a relative information recognition unit 707, a relative information control unit 708, an abnormality detection unit 709, a determination unit 710, and a motion control unit 711.

The integrated recognition unit 702 creates external recognition information from external information transmitted from at least one of a plurality of the recognition devices 306 and the communication device 303, and integrates the plurality of pieces of external recognition information to create an external recognition map described below. The integrated recognition unit 702 transmits the created external recognition map to the automatic driving control unit 703. The integrated recognition unit 702 transmits the created external recognition map to the communication device 111 of the safety monitoring system 101 via the communication device 303.

The automatic driving control unit 703 creates and transmits, to the determination unit 710 and the abnormality detection unit 709, automatic driving control information on the basis of the external recognition map created by the integrated recognition unit 702 and an input instruction created by the input reception unit 704. The automatic driving control unit 703 gives an output instruction to the output management unit 705 and a notification instruction to the notification management unit 706.

The input reception unit 704 receives an input signal transmitted from the input device 308 in response to a user's operation, converts the input signal to create an input instruction, and transmits the input instruction to the automatic driving control unit 703 and the determination unit 710. The output management unit 705 gives an output instruction to the output device 307 in response to each output instruction from the automatic driving control unit 703, the abnormality detection unit 709, and the relative information control unit 708. The notification management unit 706 gives a notification instruction to the notification device 309 in response to each notification instruction from the automatic driving control unit 703, the abnormality detection unit 709, and the relative information control unit 708.

On the basis of the external information acquired by the recognition device 306, the relative information recognition unit 707 creates and transmits, to the abnormality detection unit 709 and the relative information control unit 708, relative information described below. On the basis of the relative information created by relative information recognition unit 707 and the state of the vehicle 102 acquired by recognition device 306, the relative information control unit 708 creates and transmits, to the determination unit 710, the automatic driving control information. The relative information control unit 708 gives an output instruction to the output management unit 705 and a notification instruction to the notification management unit 706.

On the basis of additional information of the automatic driving control information created by automatic driving control unit 703 or additional information of the relative information created by relative information recognition unit 707, the abnormality detection unit 709 detects an abnormality of the vehicle 102 and transmits the detection result to the determination unit 710. The abnormality of the vehicle 102 detected by the abnormality detection unit 709 includes an abnormality of the vehicle control system 302 and an abnormality of the safety control function of the vehicle 102. The abnormality detection unit 709 gives an output instruction to the output management unit 705 and a notification instruction to the notification management unit 706. Details of the abnormality detection unit 709 will be described below.

On the basis of the automatic driving control information created by the automatic driving control unit 703 or the relative information control unit 708, the verification result or the control command transmitted from the safety monitoring system 101 and received by the communication device 303, the detection result by the abnormality detection unit 709, the input instruction created by the input reception unit 704, and the like, the determination unit 710 gives a control instruction to the motion control unit 711. In particular, the determination unit 710 transmits the automatic driving control information to the safety monitoring system 101 via the communication device 303, and gives a control instruction to the motion control unit 711 on the basis of the verification result of the automatic driving control information received by the communication device 303. On the basis of the detection result by the abnormality detection unit 709 and the control command received by the communication device 303, the determination unit 710 can determine whether to give a control instruction to the motion control unit 711 in response to the automatic driving control information created by any of the automatic driving control unit 703, the relative information control unit 708, or the safety monitoring system 101. Then, the determination unit 710 transmits the automatic driving control information corresponding to the determination result to the motion control unit 711, and gives the control instruction to the motion control unit 711. In other words, the determination unit 710 performs switching processing of switching whether the automatic driving control information to be transmitted to the motion control unit 711 is the automatic driving control information created by the automatic driving control unit 703, the relative information control unit 708, or the safety monitoring system 101. Details of the determination unit 710 will be described below.

The motion control unit 711 controls each of a plurality of the drive devices 305 in accordance with a control instruction (automatic driving control information) from the determination unit 710, information acquired by the recognition device 306, and a response from the drive device 305. Details of the motion control unit 711 will be described below.

Figure 8:
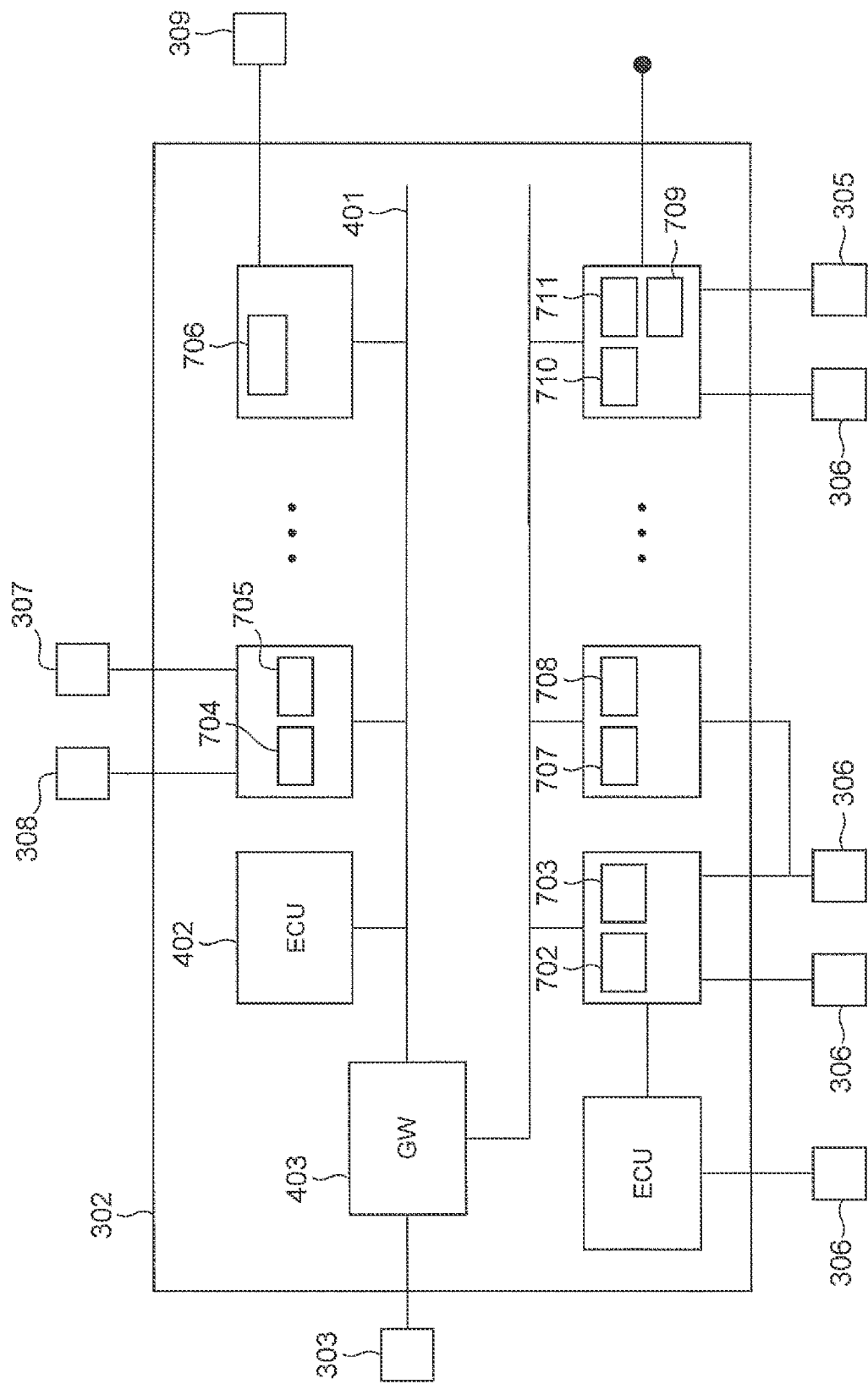
FIG. 8 is a view illustrating an example in which each function of the vehicle control system illustrated in FIG. 7 is implemented in the hardware configuration illustrated in FIG. 4.

FIG. 8 is a view illustrating an example in which each function of the vehicle control system 302 illustrated in FIG. 7 is implemented in the hardware configuration illustrated in FIG. 4.

The vehicle control system 302 may include some or all of the communication device 303, the drive device 305, the recognition device 306, the output device 307, the input device 308, and the notification device 309. The vehicle control device refers to a device having some or all functions of the vehicle control system 302. As illustrated in FIG. 7, the vehicle control system 302 includes a plurality of functions, and there are a plurality of patterns in implementation into the hardware illustrated in FIG. 4. Each function of the vehicle control system 302 can be, for example, a pattern as illustrated in FIG. 8. Each function of the vehicle control system 302 is not limited to the implementation pattern illustrated in FIG. 8, and may be implemented on the ECU 402 or the GW 403 different from the ECU 402 and the GW 403 illustrated in FIG. 8.

<External Recognition Method>

Figure 9:
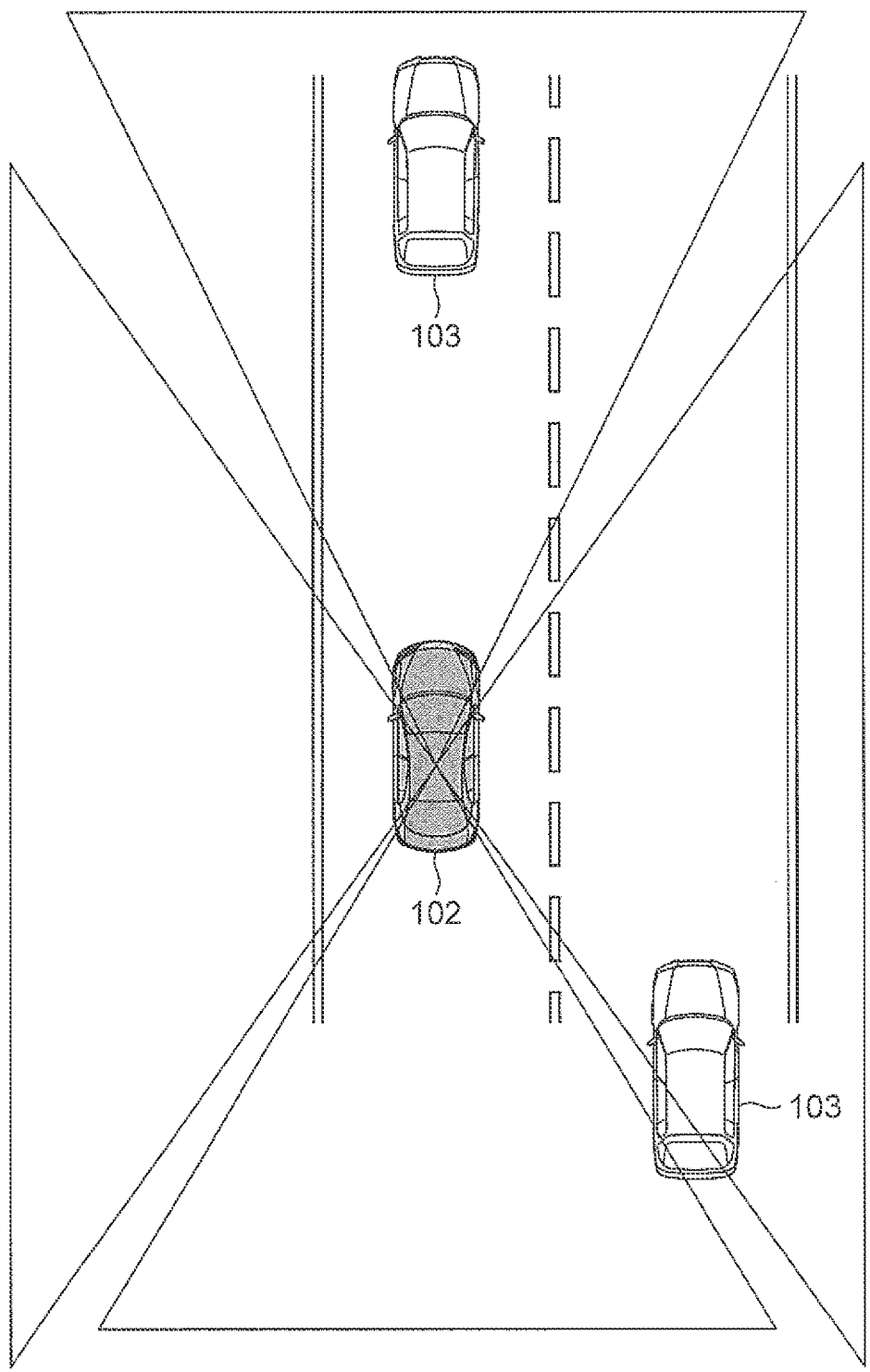
FIG. 9 is a view explaining an example of an external recognition method.

FIG. 9 is a view explaining an example of the external recognition method.

Each of the recognition device 306 of the vehicle 102 and the monitoring device 112 of the safety monitoring system 101 may include a plurality of types of external sensors as described above. The vehicle control system 302 and the safety monitoring system 101 create external recognition information from information (sensed information) acquired by an operation principle corresponding to respective external sensors. For example, each of the vehicle control system 302 and the safety monitoring system 101 measures the external world using an external sensor, applies a specific algorithm (for example, an image recognition algorithm for the acquired image) to a measurement value, and creates external recognition information.

A measurable range of each of the recognition device 306 and the monitoring device 112 is determined in advance. For example, as for a camera, the recognition limit of a far distance due to the imaging direction, the vertical and horizontal angles, and the number of pixels is determined in advance. For a radar, a radiation angle, a reception angle, a distance, and the like of radio waves are determined in advance. Each of the recognition device 306 and the monitoring device 112 measures and determines a measurable range by performing adjustment (calibration) with respect to a change in response to the environment. By integrating a plurality of pieces of external recognition information, the vehicle control system 302 and the safety monitoring system 101 can confirm the situations of the vehicle 102 and the field F, respectively. For example, FIG. 9 illustrates an example in which each of the recognition devices 306 arranged in four directions (front, rear, left, and right) of the vehicle 102 acquires external information. The integrated recognition unit 702 can confirm as to what object to exist around the vehicle 102 by integrating each piece of external recognition information created from the external information acquired by each of the recognition devices 306.

The external recognition information can also be acquired from the information acquired by each of the communication device 303 of the vehicle 102 and the communication device 111 of the safety monitoring system 101. For example, the communication device 303 can acquire, together with the position information, information including an object unrecognizable by the recognition device 306, for example, an object hidden by a sheltering object in the shadow or the like. By creating external recognition information indicating the existence position of the object from these pieces of information, the vehicle control system 302 can confirm the existence position of the object. The external information acquired by each of the communication device 303 and the communication device 111 also includes map information (terrain shape, road, lane information) around the vehicle 102 and road traffic situations (traffic density, whether or not under construction, and the like).

In the above description, the creation of external recognition information in the vehicle 102 is performed by the integrated recognition unit 702, but may be performed by the recognition device 306 or the communication device 303 itself that has acquired the external information. Similarly, in the above description, the creation of external recognition information in the safety monitoring system 101 is performed by the monitoring processing unit 204, but may be performed by the monitoring device 112 or the communication device 111 itself that has acquired the external information.

<External Recognition Information>

The external recognition information is information expressing an object observed by the recognition device 306 or the monitoring device 112 or an object received by the communication device 303 or the communication device 111. Examples of the external recognition information include object types (static objects (walls, white lines, signals, median strips, trees, and the like), dynamic objects (pedestrians, cars, two-wheeled vehicles, bicycles, and the like), whether or not to be a region where travel (entry) is permitted, and other attribute information), relative position information (direction and distance) of the object, absolute position information (coordinates and the like) of the object and the self, the speed and orientation (moving direction, orientation of face of pedestrian) of the object, acceleration, existence probability (likelihood), map information, road traffic situations, external measurement time, and the ID of the recognition device 306 or the monitoring device 112 that has carried out the measurement.

<External Recognition Map>

Figure 10:
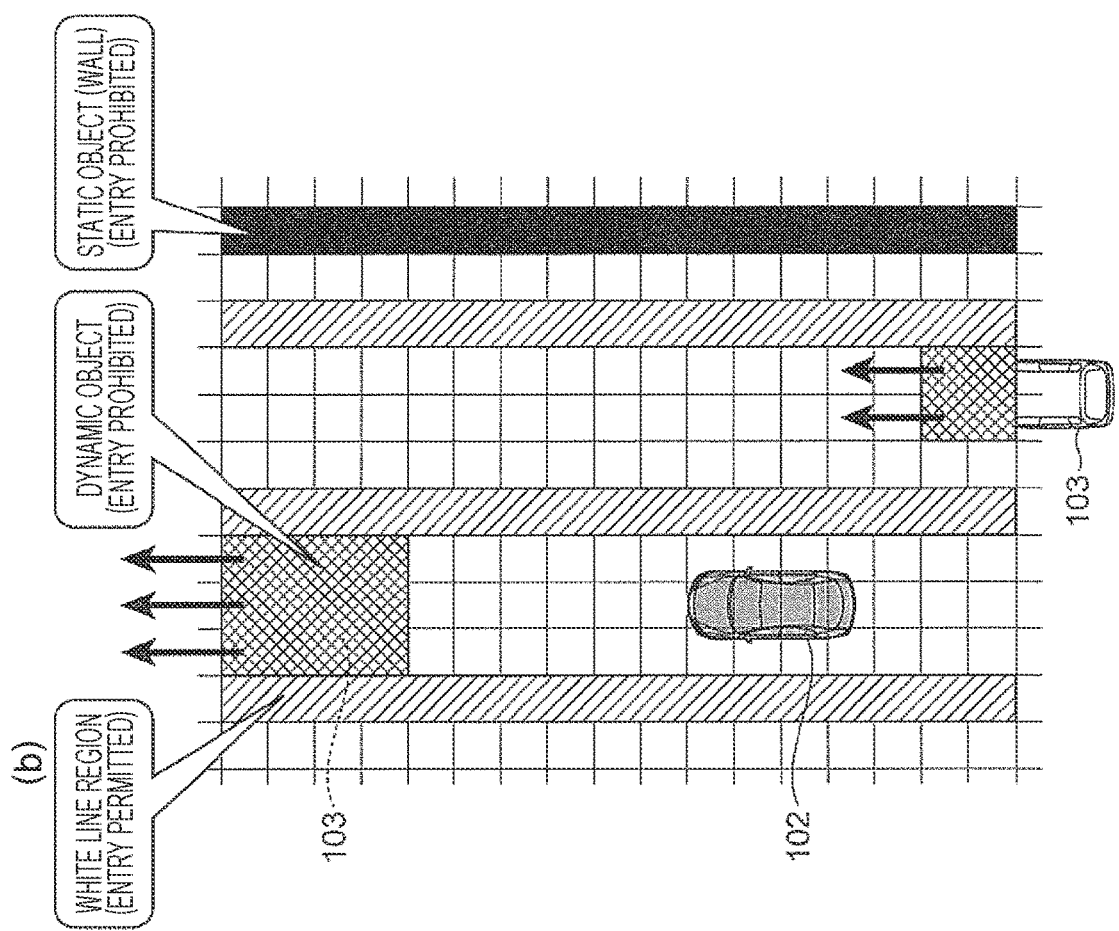
FIG. 10(a) is a view illustrating an example of a coordinate system used for an external recognition map.
FIG. 10(b) is a view illustrating an example of an external recognition map created by arranging object information in the coordinate system illustrated in FIG. 10 (a).
Figure 10:
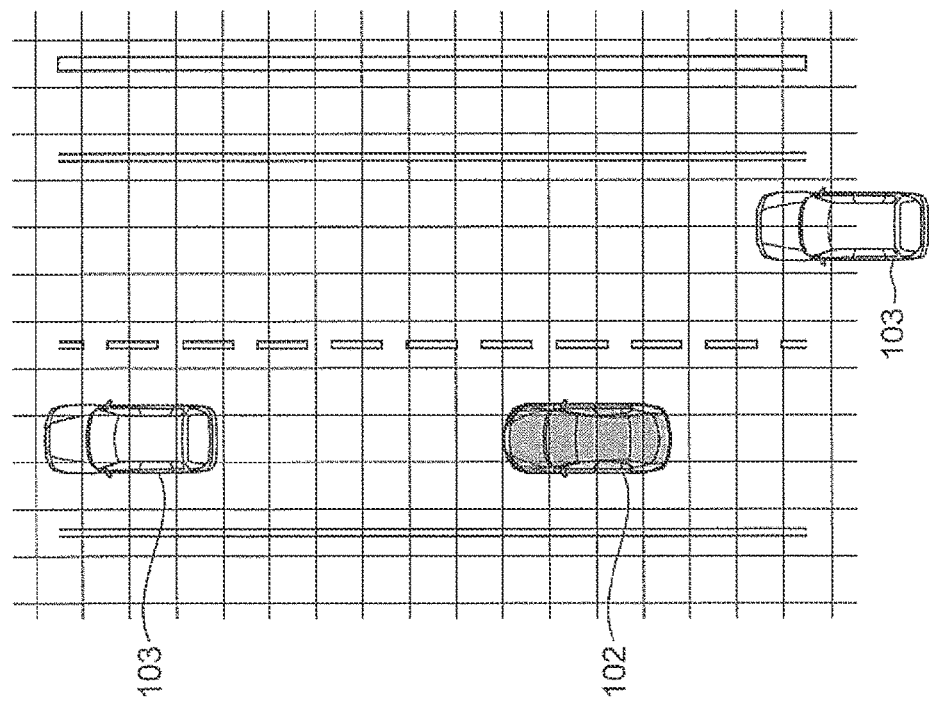

FIG. 10(a) is a view illustrating an example of the coordinate system used for an external recognition map. FIG. 10(b) is a view illustrating an example of an external recognition map created by arranging object information in the coordinate system illustrated in FIG. 10(a).

The integrated recognition unit 702 integrates external recognition information created from the external information acquired by at least one of the plurality of recognition devices 306 and the communication device 303 to create an external recognition map of the periphery of the vehicle 102 (that is, integrated recognition information). For example, as illustrated in FIG. 10(a), the integrated recognition unit 702 applies coordinate systems (grid) orthogonal to each other to an image around the vehicle 102, map information, and the like, and as illustrated in FIG. 10(b), arranges (maps) object information to each region of the coordinate system. The object information is content obtained by removing the position information of the object from the external recognition information.

Also in the monitoring processing unit 204, similarly to the integrated recognition unit 702, the external recognition information created from the external information acquired by at least one of a plurality of the monitoring devices 112 and the communication device 111 is integrated to create an external recognition map of the field F. In particular, the monitoring processing unit 204 can create an external recognition map of the field F by integrating the external recognition information (or the external recognition map) transmitted from a plurality of the vehicles 102 and received by the communication device 111.

<Action Prediction>

The integrated recognition unit 702 can create the external recognition map not only by using the currently recognized external recognition information but also by performing prediction (action prediction) from past external recognition information. For example, there is a high possibility that a static object exists at the same position (not relative position to vehicle but same position on road surface) after a lapse of a predetermined time. The position of a dynamic object after a lapse of a predetermined time can be predicted from the position immediately before, speed, acceleration, and the like. By performing the action prediction in this manner, the integrated recognition unit 702 can also perform the action prediction for the object existing at a currently unrecognizable position, and can recognize the object.

The integrated recognition unit 702 can perform action prediction of the object on the basis of the created external recognition map. However, for example, the recognition device 306 may perform action prediction, add an action prediction result to the acquired external information, and transmit the information to the integrated recognition unit 702. In this case, each of the plurality of recognition devices 306 performs the action prediction, and the calculation amount related to the action prediction of the integrated recognition unit 702 can be reduced. As another method, the automatic driving control unit 703 may perform action prediction of a necessary object from the current external recognition map. In this case, the communication load from the integrated recognition unit 702 to the automatic driving control unit 703 can be reduced, and the action prediction is performed only with the object necessary for creation and determination of the automatic driving control information, and therefore the calculation amount can be reduced.

Similarly to the integrated recognition unit 702, the monitoring processing unit 204 can perform action prediction of the object on the basis of the created external recognition map. Similarly to the integrated recognition unit 702, the monitoring processing unit 204 can create the external recognition map by not only using the currently recognized external recognition information but also performing action prediction from the past external recognition information. The monitoring processing unit 204 can perform action prediction using not only the created external recognition map but also a plurality of pieces of automatic driving control information transmitted from the plurality of vehicles 102 and received by the communication device 111. This allows the monitoring processing unit 204 to perform action prediction with higher accuracy.

<Automatic Driving Control Information (Track)>

Figure 11:
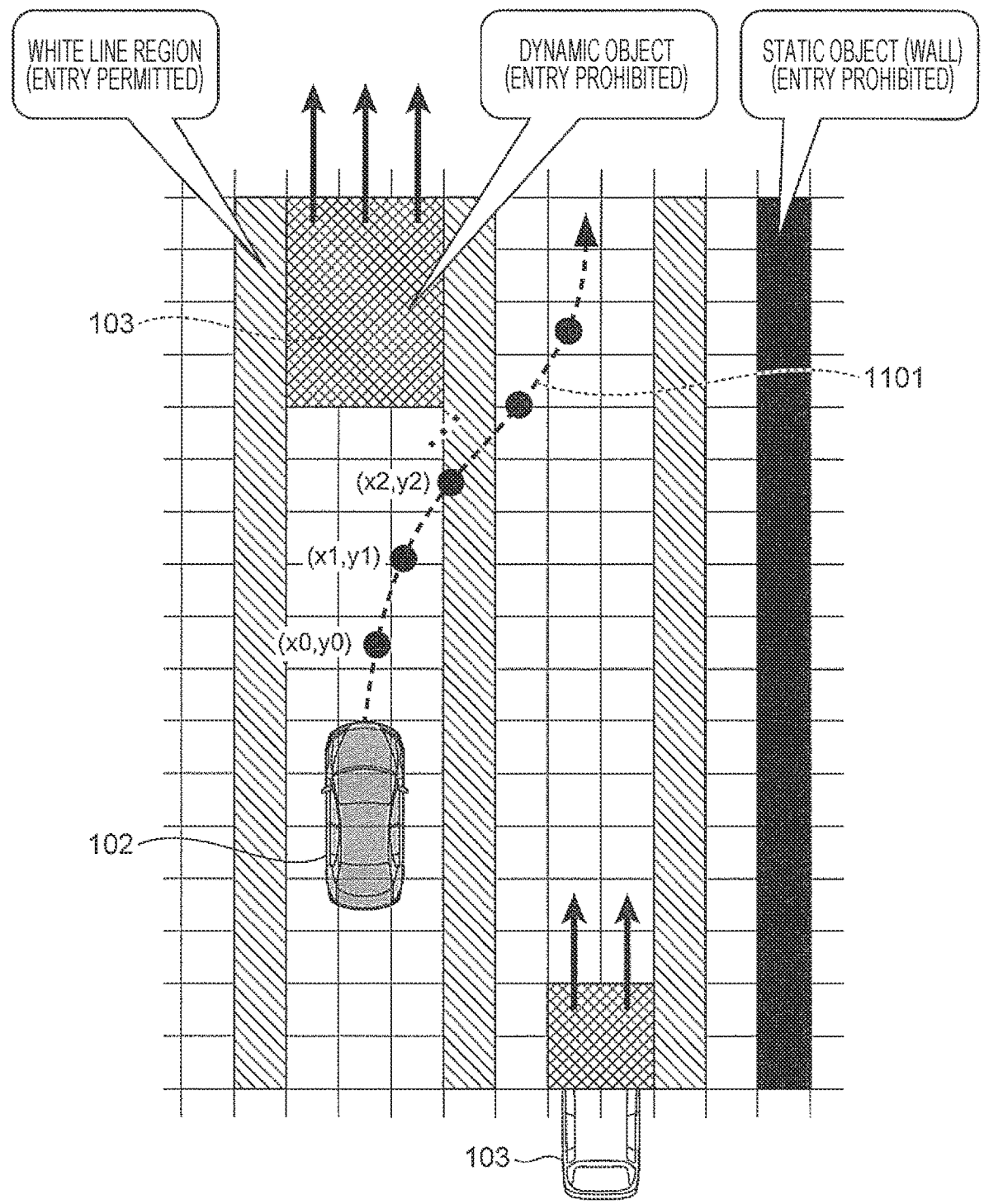
FIG. 11 is a view illustrating an example of a track created on the basis of the external recognition map illustrated in FIG. 10(b).

FIG. 11 is a view illustrating an example of a track created on the basis of the external recognition map illustrated in FIG. 10(b).

The automatic driving control information is information for controlling automatic driving of the vehicle 102. For example, the automatic driving control information is information of a track indicating a future position of the vehicle 102. The automatic driving control information may be control information or the like of the drive device 305 necessary for the vehicle 102 to travel along the track. Hereinafter, a creation method of automatic driving control information based on an external recognition map will be described with an example of a track that is an example of the automatic driving control information.

The track is created so as to satisfy a safety constraint on the condition that the vehicle 102 can travel safely (for example, the risk of collision with other objects is low) and a motion constraint on the condition that the speed, acceleration, yaw rate, and the like that can be achieved by the vehicle 102. The track is represented by, for example, a set of coordinates of the own vehicle position at predetermined time intervals. In another example, the track is represented by a set of motion control values (target acceleration and yaw rate) at predetermined time intervals, a vector value (direction and speed) of the own vehicle at predetermined time intervals, a time interval for traveling a predetermined distance, or the like.

FIG. 11 illustrates a track 1101 represented by a set of (future) coordinates of the own vehicle position at predetermined time intervals when the vehicle 102 changes the lane to the right lane. FIG. 11 illustrates an example in which there is another vehicle 103 traveling on the right lane, but the vehicle 102 is faster and can change lanes.

First, the automatic driving control unit 703 creates the track 1101 on which the vehicle 102 satisfies the motion constraint and moves to the right lane. Thereafter, regarding the created track 1101, the automatic driving control unit 703 calculates whether a collision will not occur by a predicted track (for example, a position after a predetermined time at a current speed and an assumed acceleration) of the vehicle 103, which is another dynamic object, and the track of the vehicle 102. When it is calculated that no collision occurs, the automatic driving control unit 703 creates the automatic driving control information on the created track 1101. When it is calculated that collision occurs, the automatic driving control unit 703 recalculates whether the collision does not occur after waiting for a predetermined time. Alternatively, another track that satisfies the motion constraint is created, and the safety constraint is similarly calculated.

Calculation methods of the safety constraint include, as described above, a method (entry prohibited region method) of setting, as an entry prohibited region, a region where a dynamic object is predicted to exist from the current speed and the assumed acceleration of the dynamic object. Other methods include a potential map method of calculating a risk of each region from the type, speed, and traveling direction of each object, and calculating a risk potential. In the case of using the potential map method, a track is created that has the lowest risk potential in the created potential map, does not enter a potential area of a predetermined value or greater, and satisfies the motion constraint of the vehicle 102. The entry prohibited region method requires action prediction of the dynamic object. For action prediction, there is a method of setting, as an entry prohibited region, a predetermined region centered on a point moved at the current speed, acceleration, and traveling direction. By setting a predetermined region as an entry prohibited region in this manner, calculation by complicated prediction becomes unnecessary.

In this manner, the automatic driving control unit 703 creates the track on the basis of the moving direction, the motion constraint, and the safety constraint of the vehicle 102, and creates the automatic driving control information on the created track. Then, the automatic driving control unit 703 transmits the created automatic driving control information to the motion control unit 711 via the determination unit 710. The motion control unit 711 controls the drive device 305 in response to the automatic driving control information. This allows the vehicle control system 302 to control the automatic driving of the vehicle 102 in response to the automatic driving control information.

<Automatic Driving Control Based on Automatic Driving Control Information>

The motion control unit 711 controls the drive device 305 so as to achieve the automatic driving control information transmitted by the determination unit 710. When the automatic driving control information is information of the track, the motion control unit 711 calculates the target speed, the yaw rate, and the like of the vehicle 102 that reflect the state (current speed, acceleration, yaw rate, and the like) of the vehicle 102 acquired by the recognition device 306 so that the vehicle 102 can follow the track. The motion control unit 711 controls the respectively necessary drive devices 305 in order to achieve the target speed, the yaw rate, and the like. This allows the motion control unit 711 to control the automatic driving of the vehicle 102 so that the vehicle 102 can follow the target track. In order to achieve the target speed, the motion control unit 711 can increase the output of the engine torque or control the brake to decelerate. In order to achieve the target yaw rate, the motion control unit 711 can control the steering. The motion control unit 711 can control the brake and the accelerator for individual wheels so that the wheel speeds become uneven.

<Override Control Information>

The override control information is information necessary for the safety monitoring system 101 to perform the override control. The override control information includes automatic driving control information (track), clock time information, a current state of the vehicle 102, a state of the safety monitoring system 101, and an ID of each constituent element.

<Processing of Vehicle Control System During Override Control>

When the communication device 303 receives the override control information transmitted from the safety monitoring system 101, the vehicle 102 transmits the override control information to the determination unit 710 of the vehicle control system 302. The determination unit 710 transmits the automatic driving control information included in the override control information to the motion control unit 711 instead of the automatic driving control information created by the automatic driving control unit 703 or the relative information control unit 708. In this manner, the vehicle control system 302 can control the automatic driving of the vehicle 102 in response to the automatic driving control information included in the override control information created by the safety monitoring system 101.

<Operation Example of Autonomous Travel Control System at Intersection>

Figure 12:
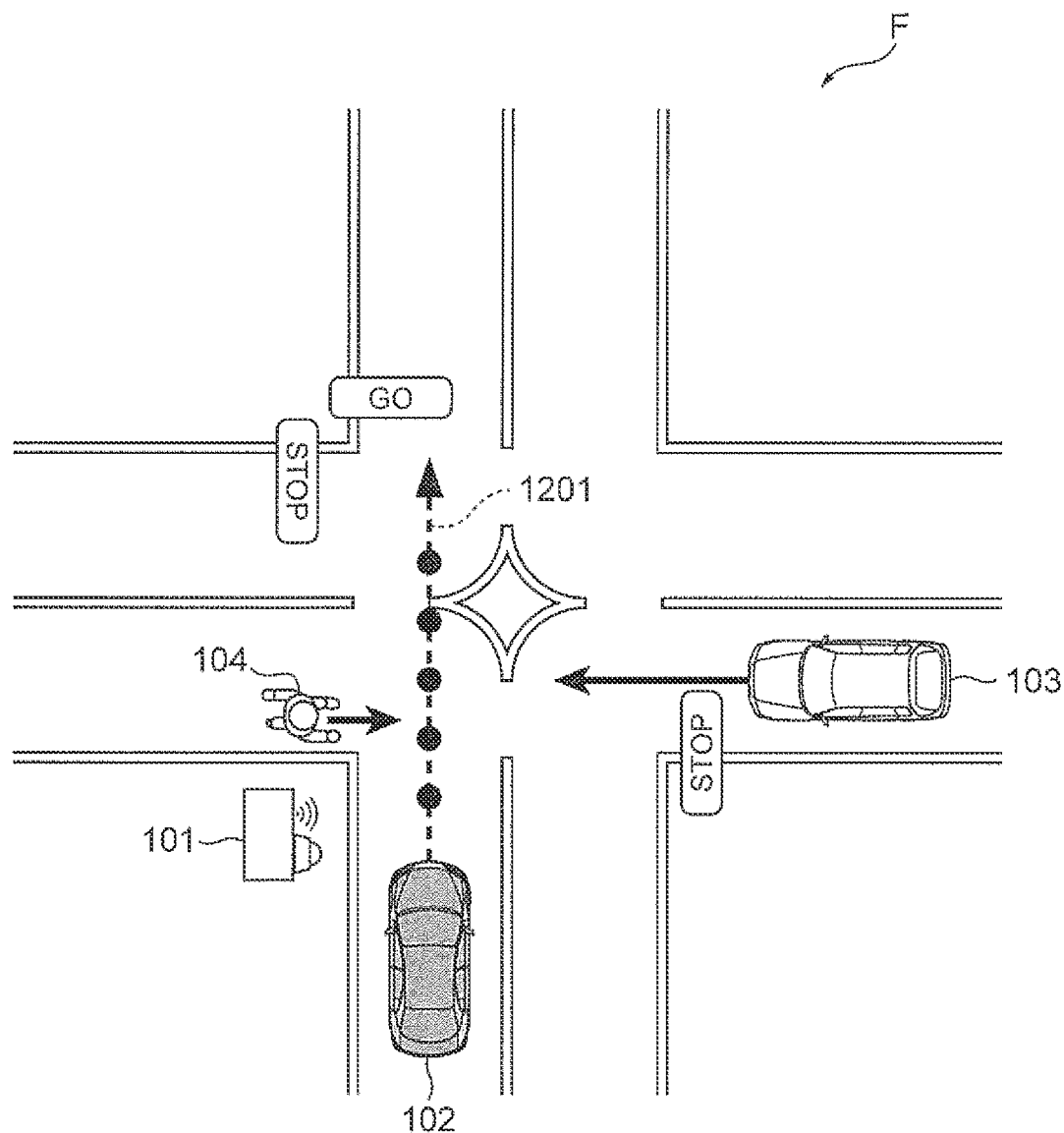
FIG. 12 is a view explaining an operation example of the autonomous travel control system of the first or second embodiment.

FIG. 12 is a view explaining an operation example of the autonomous travel control system 1 of the first or second embodiment.

In the field F illustrated in FIG. 12, there is a situation in which the vehicle 102 comes to the intersection and the vehicle 102 is about to continue traveling along a track 1201 because the traffic light for the vehicle 102 at the intersection is Go (can travel). In the field F illustrated in FIG. 12, there is a situation in which the pedestrian 104 unrecognizable by the recognition device 306 of the vehicle 102 runs out to the intersection, or the vehicle 103 without a communication device or the like ignores the red light and comes to the intersection.

In such a situation, the vehicle control system 302 of the vehicle 102 transmits the automatic driving control information of the vehicle 102 from the communication device 303 to the communication device 111 of the safety monitoring system 101. The communication device 111 and the reception unit 201 of the safety monitoring system 101 receive the automatic driving control information of the vehicle 102 transmitted from the vehicle control system 302. The reception unit 201 transmits the received automatic driving control information to the verification unit 202 and the monitoring processing unit 204. Concurrently, the monitoring device 112 of the safety monitoring system 101 monitors the field F by the external sensor, and transmits, to the monitoring processing unit 204, information acquired by the external sensor, which is a monitoring result of the field F. The monitoring processing unit 204 creates external recognition information from the external information acquired from the monitoring device 112. The monitoring processing unit 204 creates an external recognition map including action prediction of the vehicle 102 on the basis of the external recognition information and the automatic driving control information, and transmits the external recognition map to the verification unit 202 and the risk management unit 205.

The verification unit 202 verifies the safety of the automatic driving control information received by the reception unit 201 on the basis of the external recognition map created by the monitoring processing unit 204. As a specific method of this verification, in a case where the vehicle 102 travels on the basis of the automatic driving control information received by the reception unit 201, whether or not it is assumed that a high risk situation (situation of extremely approaching or colliding with another object) occurs after a lapse of a predetermined time in the vehicle 102 is verified in the external recognition map including the action prediction. When a high risk situation is assumed to occur, the verification unit 202 determines that the automatic driving control information received by the reception unit 201 is not safe, and transmits, to the transmission unit 203, a verification result indicative of not approving the automatic driving control information. When a high risk situation is not assumed to occur, the verification unit 202 determines that the automatic driving control information received by the reception unit 201 is safe, and transmits, to the transmission unit 203, a verification result indicative of approving the automatic driving control information. In the example of FIG. 12, since the vehicle 102 and the pedestrian 104 approach each other at the intersection, a high risk situation is assumed to occur. In the example of FIG. 12, the verification unit 202 determines that the automatic driving control information received by reception unit 201 is not safe, and transmits, to the transmission unit 203, a verification result indicative of not approving the automatic driving control information. This verification result is transmitted from the transmission unit 203 to the communication device 303 via the communication device 111, and is transmitted from the communication device 303 to the vehicle control system 302.

Upon receiving the verification result indicative of approving the automatic driving control information, the vehicle control system 302 controls the automatic driving in response to the automatic driving control information that has been approved. Specifically, upon receiving the verification result indicative of approving the automatic driving control information, the determination unit 710 transmits the automatic driving control information that has been approved to the motion control unit 711. The motion control unit 711 controls the drive device 305 in response to the automatic driving control information that has been approved, and controls the automatic driving of the vehicle 102.

On the other hand, upon receiving the verification result indicative of not approving the automatic driving control information, the vehicle control system 302 controls the automatic driving in response to new automatic driving control information different from the automatic driving control information that has not been approved. Specifically, upon receiving the verification result indicative of not approving the automatic driving control information, the determination unit 710 instructs the automatic driving control unit 703 to create new automatic driving control information different from the automatic driving control information that has not been approved. As new automatic driving control information, the automatic driving control unit 703 creates, for example, automatic driving control information for decelerating or stopping the vehicle 102, automatic driving control information for separating the vehicle 102 from a blind spot or another object, and the like, and transmits the automatic driving control information to the determination unit 710. The determination unit 710 retransmits the created new automatic driving control information to the safety monitoring system 101 via the communication device 303. The vehicle control system 302 repeats recreation and retransmission of the automatic driving control information in a similar procedure until receiving the verification result indicative of approving the automatic driving control information.

As another method, upon receiving the verification result indicative of not approving the automatic driving control information, the determination unit 710 may instruct the automatic driving control unit 703 to perform fail-safe processing so that vehicle 102 shifts to a safe state (for example, getting static in a lane or stopping at the edge of the road). The automatic driving control unit 703 creates and transmits, to the motion control unit 711, new automatic driving control information for shifting the vehicle 102 to a safe state.

As described above, in the autonomous travel control system 1 of the first embodiment, the safety monitoring system 101 outside the vehicle 102 verifies the safety of the automatic driving control information created by the vehicle control system 302. Then, the vehicle control system 302 controls the automatic driving of the vehicle 102 on the basis of the verification result by the safety monitoring system 101. This enables the vehicle control system 302 to perform automatic driving in response to the automatic driving control information approved as safe by the safety monitoring system 101 outside the vehicle 102. The vehicle control system 302 can perform automatic driving in response to new automatic driving control information for the vehicle 102 to shift to a safe state even if it is not approved as safe. Furthermore, since the safety of the automatic driving control information is verified by the safety monitoring system 101 that monitors the entire field F, it is possible to comprehensively and efficiently verify the safety of the automatic driving control information as compared with a case where another vehicle verifies the automatic driving control information by vehicle-to-vehicle communication or the like. The vehicle control system 302 can create automatic driving control information by utilizing the verification by the safety monitoring system 101 and control the automatic driving of the vehicle 102. Therefore, the autonomous travel control system 1 of the first embodiment can improve safety and efficiency as compared with an automatic driving system of a vehicle alone.

In the autonomous travel control system 1 of the first embodiment, the safety monitoring system 101 can create the external recognition map not on the basis of the information sensed by the vehicle alone or the infrastructure alone but on the basis of the information sensed by both the vehicle and the infrastructure, and can perform highly accurate action prediction of the vehicle 102. Then, the safety monitoring system 101 can verify the safety of the field F on the basis of the plurality of pieces of automatic driving control information. Then, the vehicle control system 302 of the first embodiment can perform automatic driving in response to the automatic driving control information approved as safe from the viewpoint of the safety of the field F. Therefore, the autonomous travel control system 1 of the first embodiment can ensure the safety of the field F.

The vehicle control system 302 can perform control to shift the vehicle 102 to a safe state when some abnormality (detected due to interruption of periodic communication or the like) occurs in communication between the vehicle 102 and the safety monitoring system 101, similarly to a case where the automatic driving control information is not approved. This allows the autonomous travel control system 1 of the first embodiment to safely perform the automatic driving of the vehicle 102 even when some abnormality occurs in the communication between the vehicle 102 and the safety monitoring system 101. Therefore, the autonomous travel control system 1 of the first embodiment can further improve the safety while securing the efficiency.

Upon receiving a verification result indicative of approving the automatic driving control information, the vehicle control system 302 controls the automatic driving in response to the automatic driving control information that has been approved, and at this time, the speed of the vehicle 102 may be maintained or increased to control the automatic driving. This is because, for example, when the vehicle passes through an intersection, it is estimated that another object such as the pedestrian 104 does not run out if the safety monitoring system 101 operates correctly. This enables the autonomous travel control system 1 of the first embodiment to further improve the efficiency while ensuring the safety.

Second Embodiment

When the automatic driving control information received by the reception unit 201 is not safe, the safety monitoring system 101 of the first embodiment transmits, to the vehicle control system 302 via the transmission unit 203, a verification result indicative of not approving the automatic driving control information. Upon receiving the verification result indicative of not approving the automatic driving control information, the vehicle control system 302 of the first embodiment creates new automatic driving control information different from the automatic driving control information that has not been approved, and controls the automatic driving in response to the new automatic driving control information.

When the automatic driving control information received by reception unit 201 is not safe, a high risk situation is assumed to occur in the vehicle 102, which is a transmission source of the automatic driving control information. Whether or not a high risk situation is assumed to occur in the vehicle 102 can be verified by the risk management unit 205 of the safety monitoring system 101. Therefore, when the automatic driving control information received by the reception unit 201 is not safe or when an unsafe event is assumed to occur in the field F, the safety monitoring system 101 of the second embodiment transmits the control command created by the risk management unit 205 to the vehicle control system 302 via the control command unit 206. The vehicle control system 302 of the second embodiment controls automatic driving in response to the control command transmitted by the control command unit 206. The unsafe event is, for example, an event in which verification of the automatic driving control information by the verification unit 202 is not in time, a situation of the field F changes after the verification, an abnormality occurs in the vehicle control system 302, or an abnormality occurs in communication with the vehicle control system 302.

In particular, the risk management unit 205 of the second embodiment creates, as a control command, override control information including automatic driving control information of the vehicle 102 in which a high risk situation is assumed to occur. The control command unit 206 of the second embodiment transmits, to the vehicle control system 302 via the control command unit 206, the override control information created by the risk management unit 205. The vehicle control system 302 of the second embodiment controls the automatic driving in response to the automatic driving control information included in the override control information transmitted by the control command unit 206. The automatic driving control information included in the override control information is new automatic driving control information different from the automatic driving control information not approved by the verification of the verification unit 202.

When the automatic driving control information received by the reception unit 201 is safe and an unsafe event is not assumed to occur in the field F, similarly to the first embodiment, the safety monitoring system 101 of the second embodiment transmits, to the vehicle control system 302 via the transmission unit 203, the verification result indicative of approving the automatic driving control information.

<Operation Example of Override Control at Intersection>

A case where an unsafe event occurs in the field F in a situation similar to that of the above illustrated in FIG. 12 will be considered. In the safety monitoring system 101 of the second embodiment, the risk management unit 205 may perform action prediction. That is, the risk management unit 205 of the second embodiment receives the external recognition map created by the monitoring processing unit 204, and performs action prediction of an object existing in the field F from the external recognition map. Then, the risk management unit 205 of the second embodiment verifies whether or not a high risk situation (situation where the vehicle 102 and an object or objects extremely approach each other or collide with each other) is assumed to occur after a lapse of a predetermined time. In the example of FIG. 12, since the vehicle 102 and the pedestrian 104 approach each other at the intersection, a high risk situation is assumed to occur. In the example of FIG. 12, the risk management unit 205 of the second embodiment creates automatic driving control information with which the vehicle 102 assumed to have a high risk situation can travel safe. For example, automatic driving control information for decelerating the vehicle 102 is created. Then, the risk management unit 205 of the second embodiment creates and transmits, to the control command unit 206, override control information for the vehicle control system 302 of the vehicle 102 including the created automatic driving control information. This override control information is transmitted from the control command unit 206 to the communication device 303 via the communication device 111, and is transmitted from the communication device 303 to the vehicle control system 302.

Upon receiving the override control information, the vehicle control system 302 of the second embodiment controls the automatic driving in response to the automatic driving control information included in the override control information having been received. Specifically, the determination unit 710 of the second embodiment transmits, to the motion control unit 711, the automatic driving control information included in the override control information instead of the automatic driving control information created by the automatic driving control unit 703. This allows the vehicle control system 302 of the second embodiment to avoid a high risk situation from occurring.

As described above, in the autonomous travel control system 1 of the second embodiment, since the safety monitoring system 101 can perform the override control, the vehicle 102 can be controlled to a safe state from the outside of the vehicle 102. The autonomous travel control system 1 of the second embodiment can reliably ensure the safety of the field F, and can further improve safety and efficiency as compared with the automatic driving system of the vehicle alone.

Regarding the automatic driving control information, it is necessary to give a time stamp (clock time corresponding to the coordinates of the external recognition map) in order for the vehicle control system 302 to determine as to what time point the automatic driving control information is at. Also regarding synchronization of the clock time for giving the time stamp, the vehicle control system 302 and the safety monitoring system 101 are only required to perform communication of clock time information to synchronize the clock time of them.

In the autonomous travel control system 1 of the second embodiment, the control command created by the risk management unit 205 may be not the override control information but a control command simpler than the override control information. For example, the control command created by the risk management unit 205 may be a command simply instructing acceleration, deceleration, stop, or steering, a command instructing avoidance of XX meters to the left or YY meters to the right, or the like. This enables the autonomous travel control system 1 of the second embodiment to suppress the communication load and the processing load between the safety monitoring system 101 and the vehicle 102, and enables the vehicle control system 302 to quickly receive the control command. The vehicle control system 302 of the second embodiment can quickly avoid a high risk situation from occurring.

When the control command created by the risk management unit 205 is the above-described simple control command, the vehicle control system 302 of the second embodiment can create the automatic driving control information in consideration of information regarding own vehicle control (for example, the limit value of the motion control, the road surface condition, and the current state of the vehicle 102). Hence, since the vehicle control system 302 can perform automatic driving more suitable for the state of the vehicle 102, the autonomous travel control system 1 of the second embodiment can further improve safety and efficiency.

In the autonomous travel control system 1 of the second embodiment, the safety monitoring system 101 can perform the override control on each of the plurality of vehicles 102. Specifically, in the safety monitoring system 101 of the second embodiment, the risk management unit 205 creates the automatic driving control information for each of the plurality of vehicles 102 so that each of the plurality of vehicles 102 can travel safe, and creates the override control information for each of the plurality of vehicles 102. Then, in the safety monitoring system 101 of the second embodiment, the control command unit 206 transmits the override control information to each of the plurality of vehicles 102. This enables the autonomous travel control system 1 of the second embodiment to further reliably ensure the safety of the field F.

In the autonomous travel control system 1 of the second embodiment, when the transmission of the automatic driving control information from the vehicle 102 to the safety monitoring system 101 is interrupted, the safety monitoring system 101 can determine that some abnormality has occurred in the vehicle 102 and perform the override control. This enables the autonomous travel control system 1 of the second embodiment to safely continue the automatic driving of the vehicle 102 by the override control even when an abnormality occurs in the automatic driving control unit 703 or the like.

In the autonomous travel control system 1 of the second embodiment, the override control of the safety monitoring system 101 may be performed not only on the vehicle 102 but also on the traffic regulation device 105. That is, the safety monitoring system 101 of the second embodiment may regulate the traffic in the field F instead of the traffic regulation device 105. For example, the safety monitoring system 101 of the second embodiment can change the display of the traffic regulation device 105 from GO to STOP, blink STOP, or emit a warning sound. This enables the autonomous travel control system 1 of the second embodiment to shift the action of the object such as the vehicle 103 or the pedestrian 104 not having a communication device or the like to a safe state, and therefore the autonomous travel control system 1 of the second embodiment can secure the safety of the field F.

Similarly to the first embodiment, when the vehicle control system 302 receives the verification result indicative of approving the automatic driving control information, the autonomous travel control system 1 of the second embodiment may control the automatic driving by maintaining or increasing the speed of the vehicle 102 in response to the automatic driving control information that has been approved. This enables the autonomous travel control system 1 of the second embodiment to further improve the efficiency while ensuring the safety. Moreover, in the autonomous travel control system 1 of the second embodiment, even in a case where another object runs out exceptionally after the speed of the vehicle 102 is maintained or increased, the safety monitoring system 101 can stop the vehicle 102 by the override control. Therefore, the autonomous travel control system 1 of the second embodiment can further improve safety and efficiency as compared with the first embodiment.

Third Embodiment

When the automatic driving control information received by reception unit 201 is safe, the safety monitoring system 101 of the first embodiment transmits a verification result indicative of approving the automatic driving control information to the vehicle control system 302 via the transmission unit 203. Upon receiving the verification result indicative of approving the automatic driving control information, the vehicle control system 302 of the first embodiment controls the automatic driving in response to the automatic driving control information that has been approved. However, depending on the vehicle 102, there is a possibility that behavior (for example, speed, direction, or track) deviates from the automatic driving control information that has been approved. Therefore, in a case where the behavior of the vehicle 102 deviates from the automatic driving control information that has been approved from the external information acquired by the monitoring device 112, the safety monitoring system 101 of the third embodiment performs the override control on the vehicle 102. That is, when the vehicle 102 to which the verification result indicative of approving the automatic driving control information is transmitted shows behavior deviating from the automatic driving control information that has been approved, the risk management unit 205 of the third embodiment creates the override control information for the vehicle control system 302 of the vehicle 102 showing the behavior. The control command unit 206 of the third embodiment transmits the override control information created by the risk management unit 205 to the vehicle control system 302 of the vehicle 102.

<Operation Example of Safety Monitoring System in Passing>

Figure 13:
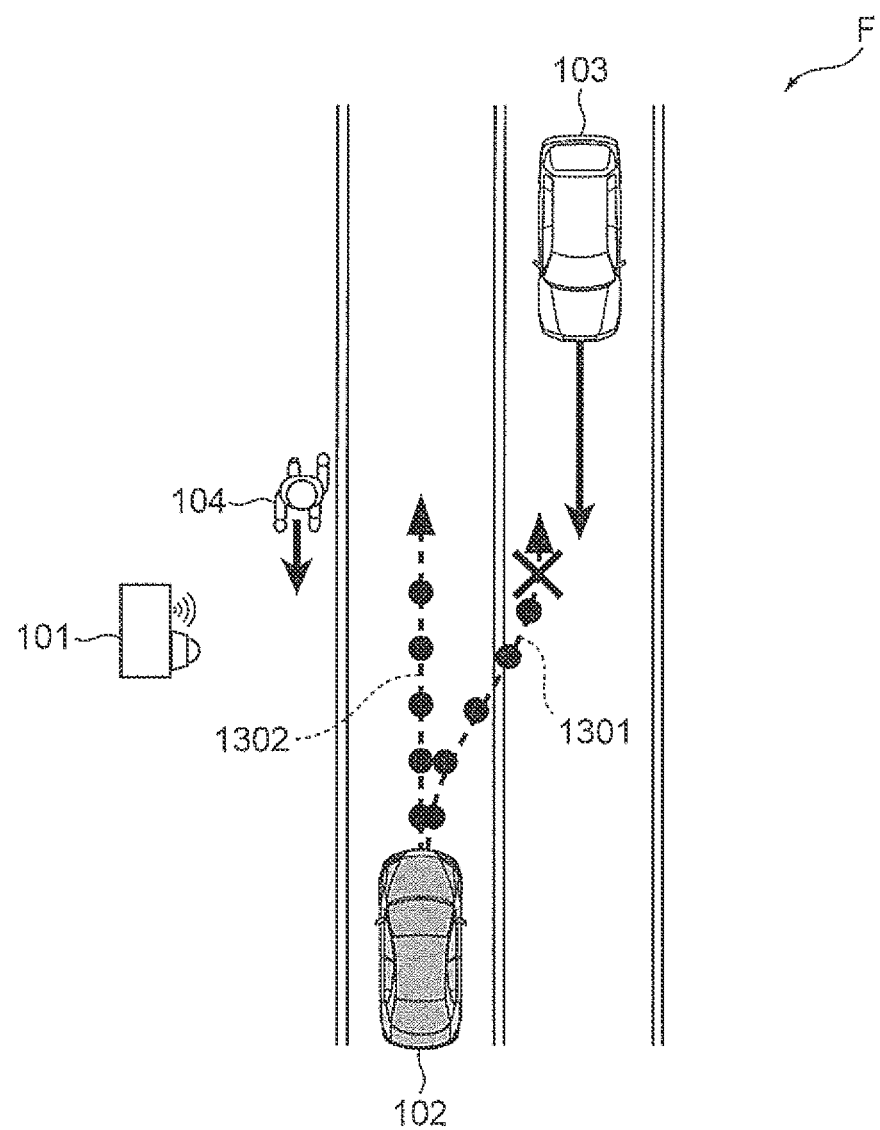
FIG. 13 is a view explaining an operation example of the autonomous travel control system of a third embodiment.

FIG. 13 is a view explaining an operation example of the autonomous travel control system 1 of the third embodiment.

In the field F illustrated in FIG. 13, there is a situation where the vehicle 102 is traveling in a lane, and the vehicle 103, which is an oncoming vehicle, and the pedestrian 104 exist around the vehicle 102. In the example of FIG. 13, it is assumed that the vehicle control system 302 creates and transmits, to the safety monitoring system 101, automatic driving control information (track 1302) for traveling in the lane, and controls the automatic driving in response to the automatic driving control information approved by the safety monitoring system 101. However, according to the external information acquired by the monitoring device 112, the behavior of the vehicle 102 deviates from the automatic driving control information that has been approved and is behavior (track 1301) of deviating from the lane.

In such a situation, the monitoring processing unit 204 of the third embodiment compares the external information acquired by the monitoring device 112 with the automatic driving control information received by the reception unit 201. When the two deviate from each other, the monitoring processing unit 204 specifies a deviation from the position, speed, or direction indicated by the automatic driving control information, and notifies the risk management unit 205 of the deviation. The risk management unit 205 of the third embodiment determines that an abnormality has occurred in the vehicle 102 showing the behavior deviating from the automatic driving control information received by the reception unit 201, and creates the automatic driving control information enabling the vehicle 102 to travel safe. For example, automatic driving control information for causing the vehicle 102 to travel along a lane or automatic driving control information for causing the vehicle 102 to shift to a safe state (getting static in a lane or stopping at the edge of the road) is created. Then, the risk management unit 205 of the third embodiment creates and transmits, to the control command unit 206, override control information for the vehicle control system 302 of the vehicle 102 including the created automatic driving control information. This override control information is transmitted from the control command unit 206 to the communication device 303 via the communication device 111, and is transmitted from the communication device 303 to the vehicle control system 302.

As described above, when the vehicle 102 to which the verification result indicative of approving the automatic driving control information is transmitted shows behavior deviating from the automatic driving control information that has been approved, the autonomous travel control system 1 of the third embodiment can perform the override control of the vehicle 102 showing the behavior. This allows the autonomous travel control system 1 of the third embodiment to detect an abnormality of the vehicle 102 such as behavior deviating from the automatic driving control information that has been approved, and can control the vehicle 102 to a safe state. Therefore, the autonomous travel control system 1 of the third embodiment can further improve safety and efficiency as compared with an automatic driving system of a vehicle alone.

Even when the override control is performed, there is a case where the state of the vehicle 102 does not return to the normal state due to an abnormality of the drive device 305, for example. In this case, the safety monitoring system 101 of the third embodiment may perform the override control of gradually shifting the vehicle 102 to a safe state while confirming the external information acquired by the monitoring processing unit 204. For example, the safety monitoring system 101 of the third embodiment may sequentially create automatic driving control information for continuing automatic driving, automatic driving control information for gradually decelerating, and automatic driving control information for finally getting static, and perform override control for gradually shifting the vehicle 102 to a safe state. This allows the autonomous travel control system 1 of the third embodiment to control the vehicle 102 to a safe state as much as possible even when the vehicle 102 has an abnormality that is difficult to recover.

The safety monitoring system 101 of the third embodiment may determine, in the following manner, whether or not the behavior of the vehicle 102 deviates from the automatic driving control information that has been approved. That is, when a difference between the position of the vehicle 102 indicated by the automatic driving control information that has been approved and the actual position of the vehicle 102 deviate from each other exceeds a predetermined threshold over a predetermined time or when the difference continuously exceeds the predetermined threshold, the safety monitoring system 101 may determine that the both deviate from each other. Alternatively, when a difference between the acceleration or the like (acceleration of vehicle 102 and yaw rate) of the vehicle 102 indicated by the automatic driving control information that has been approved and the actual acceleration or the like of the vehicle 102 exceeds a predetermined threshold for a predetermined time or the like, the safety monitoring system 101 may determine that the both deviate from each other. As another method, even when the vehicle 102 shows unexpected behavior such as the case where the actual vehicle 102 shows behavior (track 1301) of deviating from the lane although the automatic driving control information that has been approved is the automatic driving control information (track 1302) with which the vehicle does not deviate from the lane as described above, the safety monitoring system 101 of the third embodiment may determine that the both deviate from each other.

Fourth Embodiment

<Priority Determination of Safety Control Function of Vehicle>

The autonomous travel control system 1 of the fourth embodiment performs override control in consideration of the safety control function of the vehicle 102. The safety control function is a control function that causes the vehicle 102 to travel safe or causes the vehicle 102 to shift to a safe state, such as the relative information recognition unit 707, the relative information control unit 708, the automatic driving control unit 703, and the like illustrated in FIG. 7. The safety control function is a function of performing, for example, automatic driving based on the relative information created by the relative information recognition unit 707 or automatic driving for safely decelerating (including an automatic emergency braking function). The autonomous travel control system 1 of the fourth embodiment gives priority to the control of the automatic driving by the safety control function even when the override control is performed if there is no abnormality in the safety control function, and gives priority to the override control if there is an abnormality in the safety control function.

Hereinafter, first, as a description of the safety control function, control of automatic driving based on the relative information created by the relative information recognition unit 707 will be described with reference to FIGS. 14(a) and 14(b). Next, processing of the abnormality detection unit 709 that detects abnormality of the safety control function will be described. Subsequently, processing of the determination unit 710 that performs switching processing will be described with reference to FIG. 15.

<Relative Information>

Figure 14:
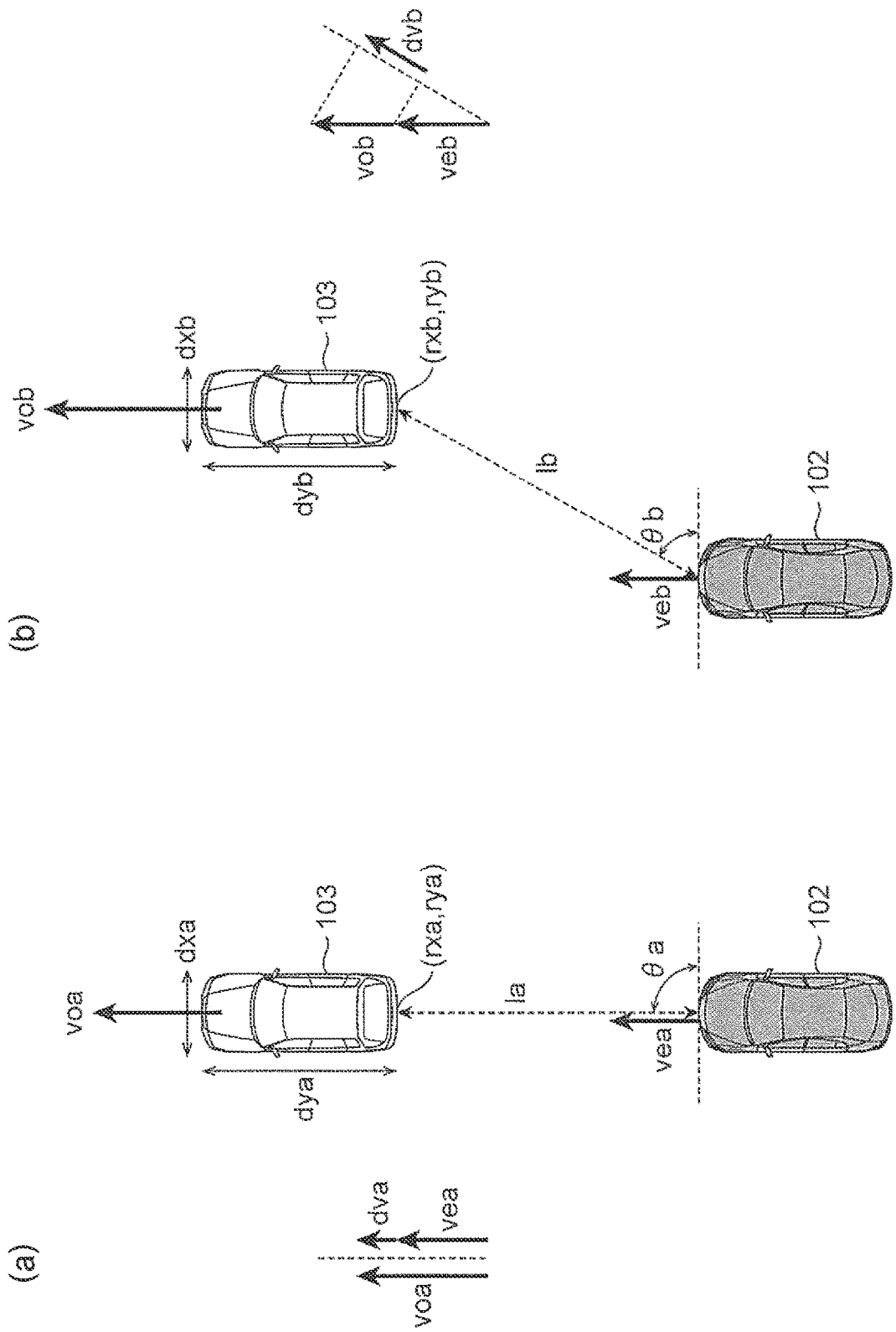
FIG. 14(a) is a view explaining an example of relative information.
FIG. 14(b) is a view explaining another example of relative information.

FIG. 14(a) is a view explaining an example of relative information. FIG. 14 (b) is a view explaining another example of relative information.

The relative information is information that can be acquired particularly from the recognition device 306 among the external recognition information. The relative information is information of a relative position between the vehicle 102 and an object around the vehicle 102, a relative speed, a relative acceleration, a value calculated from these values, or a combination of them.

FIGS. 14(a) and 14(b) illustrate examples in which the vehicle 102 recognizes the vehicle 103 that is a preceding vehicle. In the example of FIG. 14(a), the vehicle 103 exists in front of the vehicle 102. In the example of FIG. 14(a), the relative position of the vehicle 103 with respect to the vehicle 102 is a position at a distance la from the vehicle 102, and is a position at an angle θa when the right in the horizontal direction of the vehicle 102 is 0 degrees. In the example of FIG. 14(a), the relative speed of the vehicle 103 with respect to the vehicle 102 is dva. In the example of FIG. 14(b), the vehicle 103 exists on the right and in front of the vehicle 102. In the example of FIG. 14(b), the relative position of the vehicle 103 with respect to the vehicle 102 is a position at a distance lb from the vehicle 102, and is a position at an angle θb when the right in the horizontal direction of the vehicle 102 is 0 degrees. In the example of FIG. 14(b), the relative speed of the vehicle 103 with respect to the vehicle 102 is dvb.

The relative speed indicates a speed at which the vehicle 102 approaches or moves away from the corresponding object. In the example of FIG. 14(a), since the direction from the vehicle 102 toward the vehicle 103 is the same as the traveling directions of the vehicle 102 and the vehicle 103, the relative speed dva of the vehicle 103 with respect to the vehicle 102 can be expressed by a difference obtained by subtracting a speed vea of the vehicle 103 from a speed voa of the vehicle 102. In the example of FIG. 14(b), the direction from the vehicle 102 toward the vehicle 103 is not the same as the traveling directions of the vehicle 102 and the vehicle 103. Therefore, the relative speed dvb of the vehicle 103 with respect to the vehicle 102 can be expressed by a difference obtained by subtracting a speed obtained by projecting a speed veb of the vehicle 103 in a direction from the vehicle 102 toward the vehicle 103 from a speed obtained by projecting a speed vob of the vehicle 102 in the direction.

When the relative speeds dva and dvb are positive, the vehicle 103 moves away from the vehicle 102, and when the relative speeds dva and dvb are negative, the vehicle 103 approaches the vehicle 102. Although not illustrated, since the relative acceleration is a temporal change of the relative speed, the relative acceleration can be calculated from the observed temporal change of the speed.

The expression method of the relative position can be expressed by a coordinate system with the vehicle 102, which is the own vehicle, as the origin, other than the expression of the relative distance and the angle. For example, in the examples of FIGS. 14(a) and 14(b), an orthogonal coordinate system is defined in which the vehicle 102 is an origin, the front-rear direction of the vehicle 102 is a y-axis, the front of the vehicle 102 is a positive direction of the y-axis, the left-right direction of the vehicle 102 is an x-axis, and the right of the vehicle 102 is a positive direction of the x-axis. In the example of FIG. 14(a), the relative position of the vehicle 103 can be expressed as (rxa, rya), and in the example of FIG. 14(b), the relative position of the vehicle 103 can be expressed as (rxb, ryb).

In a case where the recognition device 306 can recognize, the type of the object (vehicle, pedestrian, or the like), the width of the object (dxa in FIG. 14(a) and dxb in FIG. 14(b)), and the depth of the object (dya in FIG. 14(a) and dyb in FIG. 14(b)) can also be included in the relative information.

<Control of Automatic Driving Based on Relative Information>

On the basis of the relative information created by relative information recognition unit 707 and the state of the vehicle 102 acquired by recognition device 306, the relative information control unit 708 creates and transmits, to the determination unit 710, the automatic driving control information. For example, when the vehicle 103 of the object exists in front of the vehicle 102 and the relative position (distance) in the relative information falls below a predetermined threshold, the relative information control unit 708 creates and transmits, to the determination unit 710, automatic driving control information for decelerating the vehicle 102. On the other hand, for example, when the vehicle 103 of the object exists in front of the vehicle 102 and the relative position in the relative information exceeds the predetermined threshold, the relative information control unit 708 creates and transmits, to the determination unit 710, automatic driving control information for accelerating the vehicle 102. As described above, the relative information control unit 708 accelerates or decelerates the vehicle 102 so that the relative position with respect to the vehicle 103 ahead does not exceed or fall below the predetermined threshold. Similarly, in a case where the object vehicle 103 exists behind the vehicle 102, the relative information control unit 708 accelerates or decelerates the vehicle 102 so that the relative position with respect to the vehicle 103 behind does not exceed or fall below the predetermined threshold.

The relative information control unit 708 can create automatic driving control information on the basis of not only the relative position but also the relative speed and the relative acceleration. For example, there is a case where the vehicle 103 of the object exists in front of the vehicle 102, and the relative position in the relative information does not exceed the predetermined threshold, but there is a high possibility that the vehicle 103 approaches the vehicle 102 due to the relative speed and the relative acceleration. In this case, the relative information control unit 708 creates and transmits, to the determination unit 710, automatic driving control information for decelerating the vehicle 102. For determination as to whether or not to create automatic driving control information for decelerating the vehicle 102 in this case, a risk value R calculated by the following equation (1) may be used. In equation (1), dl is a relative distance, dv is a relative speed, da is a relative acceleration, and A, B, and C are constants.

$$R = A \cdot dl + B \cdot dv + C \cdot da \tag{1}$$

Also in the case of determining as to whether or not to create automatic driving control information for decelerating the vehicle 102 using the risk value R, the relative information control unit 708 accelerates or decelerates the vehicle 102 so that the risk value R does not exceed a predetermined threshold. In this manner, the relative information control unit 708 can calculate the risk value R using the relative speed and the relative acceleration, and control the automatic driving on the basis of the risk value R. Due to this, even if the relative position does not exceed the predetermined threshold, the relative information control unit 708 can suppress a high risk situation from occurring and secure the safety of the vehicle 102.

In a case where the vehicles 103 exist in front of and behind the vehicle 102 at the same time, the relative information control unit 708 performs control such that the one with the closer relative position is away first. For example, when the vehicle 103 existing in front of the vehicle 102 is closer to the vehicle 102 than the vehicle 103 existing behind the vehicle 102 is to the vehicle 102, the vehicle 102 is decelerated. When the vehicle 103 existing behind the vehicle 102 is closer to the vehicle 102 than the vehicle 103 existing in front of the vehicle 102 is to the vehicle 102, the vehicle 102 is accelerated.

When the vehicles 103 exist not only in the front-rear direction but also in the left-right direction of the vehicle 102, the relative information control unit 708 can control the vehicle 102 on the basis of the relative information so as to steer in a direction in which the vehicle 103 does not exist in the left-right direction and avoid collision with the vehicle 103 in the front-rear direction. For this purpose, the relative information control unit 708 creates automatic driving control information including the target yaw rate of the vehicle 102.

In the relative information control unit 708, a plurality of thresholds may be determined in advance as the predetermined threshold in the relative position or the risk value R. For example, the relative information control unit 708 may control the vehicle 102 so as to give a warning to the user when the risk value R exceeds a threshold $\alpha$, perform small acceleration/deceleration when the risk value R exceeds a threshold $\beta$, and perform large acceleration/deceleration when the risk value R exceeds a threshold $\gamma$ ($\alpha < \beta < \gamma$). This allows the relative information control unit 708 to control the vehicle 102 in stages in response to the risk situation of the vehicle 102.

<Abnormality Detection>

The abnormality detection unit 709 detects an abnormality of the vehicle 102. The abnormality of the vehicle 102 detected by the abnormality detection unit 709 includes an abnormality of the vehicle control system 302 or the safety control function. That is, it can be said that the vehicle control system 302 includes the abnormality detection unit 709 that detects an abnormality of the safety control function of the vehicle 102. The abnormality of the vehicle 102 means that the state of the vehicle 102 becomes different from the state assumed at the normal time, due to a hardware failure, a software failure, an unexpected input, or the like of the vehicle 102.

The constituent elements of the vehicle 102 communicate with one another via an in-vehicle network or the like. When there is an abnormality in the communication, an event occurs in which the communication processing becomes an error response, the potential of the signal line is abnormal, the signal value of the communication is abnormal, or the like. These communication abnormalities can be detected by abnormality detection (potential detection or the like) in an electric circuit, periodic survival confirmation (heartbeat), error detection of an error detection code such as CRC, or the like.

The failure of each arithmetic device constituting the vehicle 102 can be detected by performing verification in which the same calculation is performed a plurality of times and the results are compared. The failure of a memory constituting the vehicle 102 can be detected by error detection or the like at the time of accessing the RAM or the ROM. The failure of each piece of software constituting the vehicle 102 can be detected by confirming whether the output value is out of the allowable range in addition to the above verification.

The abnormality detection unit 709 can not only detect these abnormalities by itself but also detect these abnormalities by being notified from each constituent element of the vehicle 102. For example, the automatic driving control unit 703 can detect an abnormality of each of the recognition device 306, the communication device 303, the integrated recognition unit 702, the input device 308, and the input reception unit 704 and an abnormality of each communication, and create an abnormality detection flag in response to the detection result. Then, the automatic driving control unit 703 can add the abnormality detection flag to the automatic driving control information, and transmit it to the abnormality detection unit 709. For example, the relative information recognition unit 707 can detect an abnormality of the recognition device 306 and an abnormality of communication thereof, and create an abnormality detection flag in response to the detection result. Then, the relative information recognition unit 707 can add the abnormality detection flag to the relative information, and transmit it to the abnormality detection unit 709. The abnormality detection unit 709 can detect the abnormality of the vehicle 102 by confirming the abnormality detection flag added to the received automatic driving control information or relative information. The detection result by the abnormality detection unit 709 is transmitted to the determination unit 710 and used for execution of the switching processing.

When detecting an abnormality of the vehicle 102, the abnormality detection unit 709 gives an output instruction to the output management unit 705 and a notification instruction to the notification management unit 706 so that the user and the safety monitoring system 101 are notified that an abnormality has been detected in the vehicle 102. This allows the output management unit 705 and the notification management unit 706 to notify the user and the safety monitoring system 101, respectively, of the state of the vehicle 102. The abnormality detection unit 709 may only give an output instruction to the output management unit 705 or a notification instruction to the notification management unit 706 as necessary.

<Switching Processing>

Figure 15:
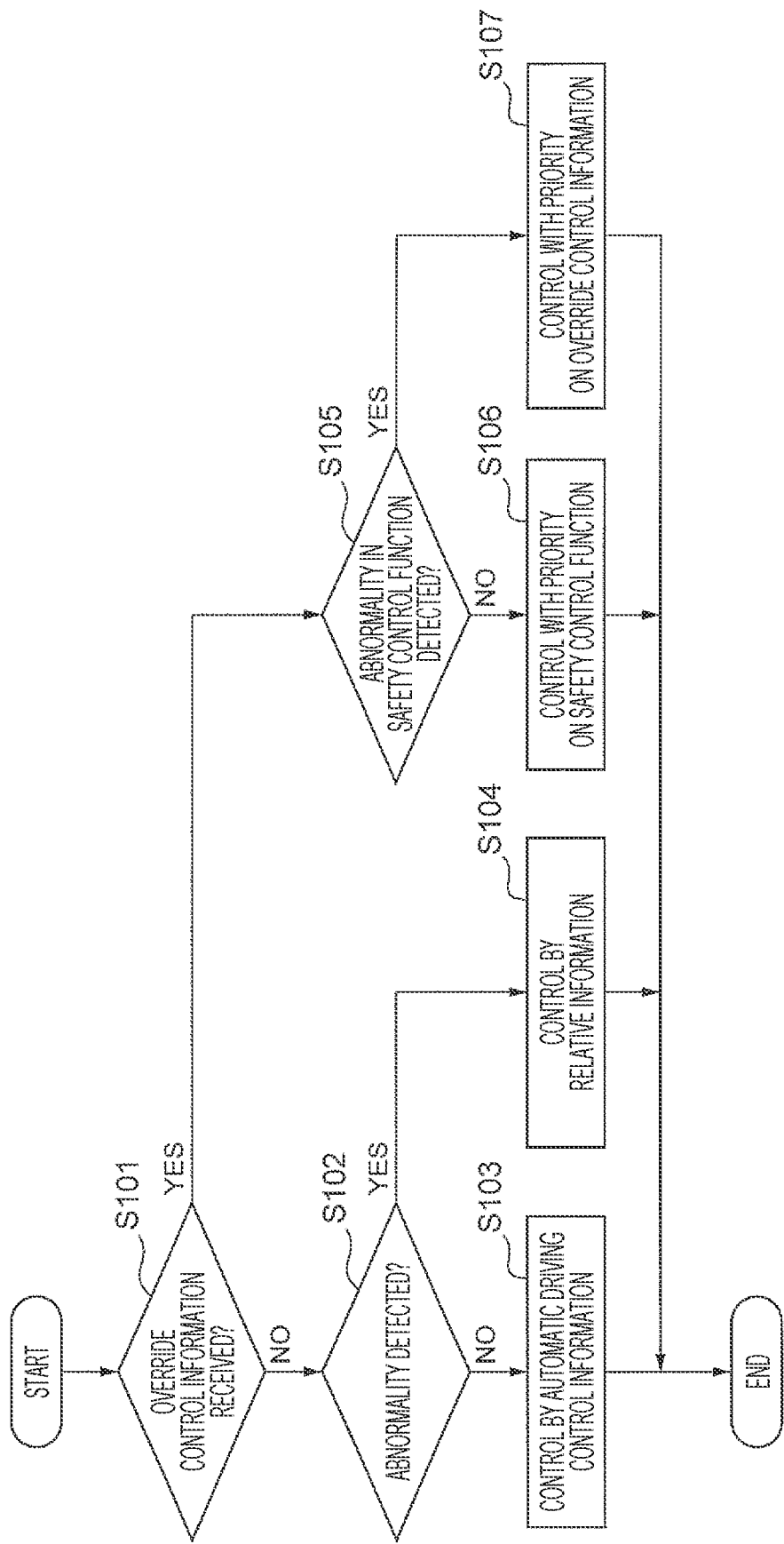
FIG. 15 is a view illustrating an example of switching processing performed by an autonomous travel control system of a fourth embodiment.

FIG. 15 is a view illustrating an example of switching processing performed by the autonomous travel control system 1 of the fourth embodiment.

The determination unit 710 of the fourth embodiment performs switching processing of switching whether the automatic driving control information to be transmitted to the motion control unit 711 is the automatic driving control information created by the automatic driving control unit 703, the relative information control unit 708, or the safety monitoring system 101. The automatic driving control information created by the safety monitoring system 101 is automatic driving control information included in the override control information.

In step S101, the determination unit 710 determines whether or not the communication device 303 has received the override control information. When the communication device 303 has received the override control information (step S101: YES), the determination unit 710 proceeds to step S105. When the communication device 303 has not received the override control information (step S101: NO), the determination unit 710 proceeds to step S102.

In step S102, the determination unit 710 receives the detection result by the abnormality detection unit 709, and determines whether or not the detection result indicates that an abnormality is detected. When the detection result by the abnormality detection unit 709 indicates that an abnormality is detected (step S102: YES), the determination unit 710 proceeds to step 3104. When the detection result by the abnormality detection unit 709 indicates that an abnormality has not been detected (step S102: NO), the determination unit 710 proceeds to step S103.

In step S103, the determination unit 710 determines to control the automatic driving in accordance with the automatic driving control information created by the automatic driving control unit 703, and transmits the automatic driving control information created by the automatic driving control unit 703 to the motion control unit 711.

In step S104, the determination unit 710 determines to control the automatic driving based on the relative information, and transmits the automatic driving control information created by the relative information control unit 708 to the motion control unit 711. In this manner, the determination unit 710 can switch the control of the automatic driving at the time of abnormality detection.

In step S105, the determination unit 710 receives the detection result by the abnormality detection unit 709, and determines whether or not the detection result indicates that an abnormality of the safety control function has been detected. When the detection result by the abnormality detection unit 709 indicates that the abnormality of the safety control function has been detected (step S105: YES), the determination unit 710 proceeds to step S107. When the detection result by the abnormality detection unit 709 indicates that the abnormality of the safety control function has not been detected (step S105: NO), the determination unit 710 proceeds to step S106.

In step S106, the determination unit 710 determines to give priority to the control of the automatic driving by the safety control function, and transmits, to the motion control unit 711, the automatic driving control information created by the relative information control unit 708 working as the safety control function.

In step S107, the determination unit 710 determines to give priority to the control of the automatic driving by the override control information, and transmits, to the motion control unit 711, the automatic driving control information included in the override control information. That is, in step S107, since the abnormality of the safety control function has been detected, control of the automatic driving by the safety control function is not performed. When the abnormality of the safety control function is detected, the determination unit 710 can notify, via the communication device 303, the safety monitoring system 101 of the detection of the abnormality of the safety control function.

As described above, the vehicle control system 302 of the fourth embodiment includes the abnormality detection unit 709 that detects an abnormality of the safety control function of the vehicle 102. When receiving the override control information and an abnormality of the safety control function is detected by the abnormality detection unit 709, the vehicle control system 302 of the fourth embodiment controls the automatic driving of the vehicle 102 in response to the automatic driving control information included in the override control information. On the other hand, when receiving the override control information, and the abnormality of the safety control function is not detected by the abnormality detection unit 709, the vehicle control system 302 of the fourth embodiment controls the automatic driving of the vehicle 102 in accordance with the safety control function.

Although the safety monitoring system 101 can perform override control by monitoring the field F in a bird's eye view, there is a case where safety can be ensured more quickly than the override control when the vehicle control system 302 instantaneously determines the situation around the vehicle 102 and controls the vehicle 102 in accordance with the safety control function. When the abnormality of the safety control function is not detected, the autonomous travel control system 1 of the fourth embodiment can give priority to the control of the automatic driving by the safety control function even when the override control is performed. This enables the autonomous travel control system 1 of the fourth embodiment to quickly ensure the safety of the vehicle 102.

Furthermore, the autonomous travel control system 1 of the fourth embodiment can secure the safety of the vehicle 102 by the safety control function in an emergency in which the vehicle gets extremely close to another object while performing the override control focusing on efficiency by increasing the speed of the vehicle 102 when the abnormality of the safety control function is not detected. When an abnormality of the safety control function is detected, the autonomous travel control system 1 of the fourth embodiment can perform the override control focusing on safety by reducing the speed of the vehicle 102. Therefore, the autonomous travel control system 1 of the fourth embodiment can simultaneously improve the safety and the efficiency of the vehicle 102.

Upon receiving a notification related to the abnormality of the safety control function from the determination unit 710, the safety monitoring system 101 of the fourth embodiment may create a flag indicating whether or not the safety control function is valid, add the flag to the override control information, and transmit it to the vehicle control system 302. This enables the autonomous travel control system 1 of the fourth embodiment to avoid conflict in the state of whether or not the safety control function is valid between the safety monitoring system 101 and the vehicle control system 302. Furthermore, the autonomous travel control system 1 of the fourth embodiment does not need the processing (step S105 in FIG. 15) of determining whether or not the abnormality of the safety control function has been detected in the vehicle control system 302, and therefore the autonomous travel control system 1 of the fourth embodiment can quickly perform the switching processing.

[Others]

The present invention is not limited to the above embodiments, and includes various modifications. For example, the above embodiments have been described in detail in order to describe the present invention in an easy-to-understand manner, and are not necessarily limited to those having all the described configurations. A part of the configuration of a certain embodiment can be replaced with the configuration of another embodiment, and the configuration of another embodiment can be added to the configuration of a certain embodiment. Another configuration can be added to, deleted from, or replaced with a part of the configuration of each embodiment.

Some or all of the above configurations, functions, processing units, processing means, and the like may be achieved by hardware, for example, by being designed with an integrated circuit. Each of the above configurations, functions, and the like may be achieved by software by a processor interpreting and executing a program for achieving each function. Information such as a program, a tape, and a file for achieving each function can be placed in a recording device such as a memory, a hard disk, and a solid state drive (SSD), or a recording medium such as an IC card, an SD card, and a DVD.

For control lines and information lines, those considered necessary for description are illustrated, and not necessarily all control lines and information lines in the product are illustrated. In practice, almost all configurations may be considered interconnected.

REFERENCE SIGNS LIST

1 autonomous travel control system
101 safety monitoring system
102 vehicle
201 reception unit
202 verification unit
203 transmission unit
204 monitoring processing unit
205 risk management unit
206 control command unit
302 vehicle control system
709 abnormality detection unit

The invention claimed is:

1. An autonomous travel control system, comprising:
a moving body control system that is equipped in a moving body and controls automatic driving of the moving body, the moving body control system including one or more electronic control units (ECUs), and a first communication device coupled to the one or more ECUs configured to transmit information wirelessly; and
a safety monitoring system including a processor, a memory, one or more cameras coupled to the processor, and a second communication device coupled to the processor,
wherein the safety monitoring system is configured to monitor, using data from the one or more cameras, which is data independent of data generated by the moving body control system, a predetermined field where the moving body travels,
wherein the safety monitoring system is configured to:
recognize an object that exists in the field from a monitoring result of the field and create external recognition information of the field based on a recognition result,
receive, via the second communication device, automatic driving control information transmitted from the first communication device of the moving body control system,
verify a safety of the automatic driving control information received by the second communication device based on the external recognition information and generate a verification result, and
transmit, via the second communication device, the verification result to the first communication device of the moving body control system, and
wherein the moving body control system is configured to control the automatic driving based on the verification result.

2. The autonomous travel control system according to claim 1,
wherein the safety monitoring system is configured to:
integrate the external recognition information to create an external recognition map of the field,
based on the external recognition map, verify the safety of the automatic driving control information,
upon determining the automatic driving control information received by the reception unit is safe, transmit, via the second communication device, to the moving body control system, the verification result which indicates approval of the automatic driving control information, and
upon determining the automatic driving control information is not safe, transmit, via the second communication device, to the moving body control system, the verification result which indicates disapproval of the automatic driving control information, and
wherein the moving body control system is configured to:
upon receiving the verification result which indicates approval of approving the automatic driving control information, control the automatic driving in response to the automatic driving control information that has been approved, and
upon receiving the verification result indicative of disapproval of the automatic driving control information, control the automatic driving in response to different control information that is different from the automatic driving control information.

3. The autonomous travel control system according to claim 2,
wherein the moving body control system is configured to:
upon receiving the verification result indicative of approval of the automatic driving control information, control the automatic driving in response to the automatic driving control information that has been approved by maintaining or increasing a speed of the moving body.

4. The autonomous travel control system according to claim 2,
wherein the safety monitoring system is configured to:
determine, based on the external recognition map and the automatic driving control information, whether the moving body will be in a high risk situation within a predetermined period of time, and create a control command for the moving body control system of the moving body, and
transmit the control command to the moving body control system, and
wherein the moving body control system is configured to control the automatic driving in response to the transmitted control command.

5. The autonomous travel control system according to claim 4,
wherein the safety monitoring system is configured to:
create, as the control command, override control information including the automatic driving control information of the moving body, and
transmit the override control information to the moving body control system of the moving body, and
wherein the moving body control system is configured to control the automatic driving in response to the automatic driving control information included in the transmitted override control information.

6. The autonomous travel control system according to claim 5,
wherein upon determining the moving body to which the verification result indicates approval of the automatic driving control information is transmitted has deviated from the automatic driving control information that has been approved, create the override control information for the moving body control system of the moving body, and
transmit the override control information to the moving body control system of the moving body.

7. The autonomous travel control system according to claim 5,
wherein the moving body control system is configured to:
determine whether an abnormality of a safety control function of the moving body is detected,
upon receiving the override control information and the detection of the abnormality of the safety control function, control controls the automatic driving in response to the automatic driving control information included in the override control information, and
upon receiving the override control information and the abnormality of the safety control function is not detected, control the automatic driving in accordance with the safety control function.

\* \* \* \* \*